United States Patent
Jones et al.

(10) Patent No.: US 6,903,301 B2
(45) Date of Patent: Jun. 7, 2005

(54) CONTACT START PLASMA ARC TORCH AND METHOD OF INITIATING A PILOT ARC

(75) Inventors: Joseph P. Jones, Lebanon, NH (US); Kevin D. Horner-Richardson, Cornish, NH (US); Shiyu Chen, Claremont, NH (US); Roger W. Hewett, Plainfield, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 352 days.

(21) Appl. No.: 10/084,009

(22) Filed: Feb. 26, 2002

(65) Prior Publication Data

US 2002/0117484 A1 Aug. 29, 2002

Related U.S. Application Data

(63) Continuation-in-part of application No. 09/794,540, filed on Feb. 27, 2001.

(51) Int. Cl.[7] ............................................... B23K 10/00
(52) U.S. Cl. ........................... 219/121.57; 219/121.52; 219/121.5; 219/121.59; 219/75
(58) Field of Search ........................ 219/121.57, 121.5, 219/121.36, 121.48, 74, 75, 121.52, 121.51, 121.59, 121.39

(56) References Cited

U.S. PATENT DOCUMENTS

| | | | |
|---|---|---|---|
| 3,832,513 A | 8/1974 | Klasson | |
| 4,567,346 A | 1/1986 | Marhic | |
| 4,902,871 A | 2/1990 | Sanders et al. | |
| 4,940,877 A | 7/1990 | Broberg | |
| 5,796,067 A | 8/1998 | Enyedy et al. | |
| 5,886,315 A | 3/1999 | Lu et al. | |
| 5,897,795 A | 4/1999 | Lu et al. | |
| 5,994,663 A | 11/1999 | Lu | |
| 6,084,199 A | 7/2000 | Lindsay et al. | |
| 6,163,008 A | 12/2000 | Roberts et al. | 219/121.48 |
| 6,403,915 B1 | 6/2002 | Cook et al. | 219/121.52 |

*Primary Examiner*—Mark Paschall
(74) *Attorney, Agent, or Firm*—Harness, Dickey & Pierce, P.L.C.

(57) ABSTRACT

A contact start plasma arc torch is provided that comprises an electrode, a tip, and an initiator that is resiliently biased into contact with the tip, the initiator being movable against the resilient bias to separate from the tip and establish a pilot arc between the initiator and the tip. The initiator is disposed within a start cartridge, which preferably comprises a coil spring that biases the initiator into contact with the tip. The plasma arc torch further comprises a plurality of head vent holes to vent gas from within the start cartridge during operation of the torch. Additionally, the tip defines a plurality of swirl holes and secondary gas holes to generate and control a plasma stream that is subsequently blown from a central exit orifice in the tip.

99 Claims, 18 Drawing Sheets

CONTACT START PLASMA ARC TORCH AND METHOD OF INITIATING A PILOT ARC

CROSS-REFERENCE TO RELATED APPLICATIONS

The present application is a continuation in part of U.S. application Ser. No. 09/794,540, titled "Contact Start Plasma Torch," filed Feb. 27, 2001.

FIELD OF THE INVENTION

The present invention relates generally to plasma arc torches and more particularly to devices and methods for initiating a pilot arc in a contact start plasma arc torch.

BACKGROUND OF THE INVENTION

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode. Further, the electrode is in a spaced relationship with the tip, thereby creating a gap, at the distal end of the torch. In operation, a pilot arc is created in the gap between the electrode and the tip, which heats and subsequently ionizes the gas. Further, the ionized gas is blown out of the torch and appears as a plasma stream that extends distally off the tip. As the distal end of the torch is moved to a position close to the workpiece, the arc jumps or transfers from the torch tip to the workpiece because the impedance of the workpiece to ground is lower than the impedance of the torch tip to ground. Accordingly, the workpiece serves as the anode, and the plasma arc torch is operated in a "transferred arc" mode.

One of two methods is typically used for initiating the pilot arc between the electrode and the tip. In the first method, commonly referred to as a "high frequency" or "high voltage" start, a high potential is applied across the electrode and the tip sufficient to create an arc in the gap between the electrode and the tip. Accordingly, the first method is also referred to as a "non-contact" start, since the electrode and the tip do not make physical contact to generate the pilot arc. In the second method, commonly referred to as a "contact start," the electrode and the tip are brought into contact and are gradually separated, thereby drawing an arc between the electrode and the tip. The contact start method thus allows an arc to be initiated at much lower potentials since the distance between the electrode and the tip is much smaller.

With contact start torches, however, the relative orientation and spacing of the electrode and the tip are critical to proper torch operation and cut quality, and providing a torch with a moving electrode and/or tip that retains the proper orientation and spacing during repeated operation is relatively difficult and expensive. Further, when a pilot arc is generated between the electrode and the tip proximate the bottom of the electrode, damage accumulates more rapidly on the tip near the orifice, which can negatively impact torch performance and cut quality. Additionally, with plasma arc torches in which the tip is movable, the tip is in different positions between the on and off modes, thereby causing difficulty in controlling the relative position of the tip with respect to the workpiece. Moreover, drag cutting, which requires the tip to be in contact with the workpiece, becomes difficult if not impossible since the tip would be moved back into contact with the electrode upon being placed into contact with the workpiece.

One known contact start plasma arc torch design employs a stationary electrode and tip, while a translatable swirl ring is in initial contact with the electrode and moves away to draw an arc between the electrode and the tip. However, such a starting method causes damage to accumulate more rapidly on the swirl ring, or the anodic element, thereby reducing the life of the swirl ring and resulting in reduced torch performance. Further, with a swirl ring as a translatable element, the gas dynamics inside the torch may be negatively impacted if the translatable swirl ring becomes misaligned and also as the translatable swirl ring becomes worn during operation. Moreover, repair or replacement of the translatable swirl ring is relatively difficult as several components within the distal end of the torch must be removed for access.

Accordingly, a need remains in the art for a contact start plasma arc torch and associated methods that reduce the amount of damage to the electrode and the tip while increasing torch performance. A further need exists for such a torch that provides for quick and efficient replacement of consumable components, (e.g., electrode, tip), disposed therein.

SUMMARY OF THE INVENTION

In one preferred form, the present invention provides a contact start plasma arc torch comprising an electrode, a tip, and an initiator that is in contact with the tip, the initiator being movable to separate from the tip and establish a pilot arc between the initiator and the tip. Preferably, the initiator is part of a start cartridge that comprises a cartridge body, a tip seat secured to a distal end of the cartridge body, and a biasing member (e.g., coil spring), disposed within the cartridge body, wherein the initiator is disposed between the biasing member and the tip seat such that the coil spring biases the initiator into contact with the tip. Generally, a working gas is directed through the start cartridge to overcome the spring bias and to move the initiator away from the tip to draw a pilot arc between the initiator and the tip.

The plasma arc torch further comprises a plurality of vent holes disposed within the cartridge body, within an insulating body, and within an anode, collectively referred to as head vent holes, which are in fluid communication such that the gas that is directed through the start cartridge to move the initiator is vented through the head vent holes. Further, another portion of the gas is directed through swirl holes and secondary gas holes in the tip to generate and stabilize a plasma stream that is blown from a central exit orifice in the tip.

In another form, a start cartridge is provided that comprises a cartridge assembly and an initiator disposed within the cartridge assembly that is used to draw a pilot arc between the initiator and a tip within a plasma arc torch. The cartridge assembly preferably comprises a cartridge body and a tip seat secured to a distal portion of the cartridge body, in addition to a biasing member that biases the initiator in contact with the tip in an idle mode of the plasma arc torch. Additionally, an initiator for initiating a pilot arc in a plasma arc torch is provided, wherein the initiator is movable against a resilient bias to establish a pilot arc between the initiator and a tip within the plasma arc torch.

In yet another form, the present invention provides a plasma arc torch head for use with a fixed electrode, a fixed tip, and a source of gas and electric power for initiating a plasma arc within a plasma arc torch. The torch head comprises head vent holes disposed at a proximal section thereof, wherein the head vent holes vent at least a portion of the gas from the torch head during operation of the plasma arc torch.

Additionally, the present invention provides a method of initiating a pilot arc in a plasma arc torch that comprises the steps of biasing an initiator into contact with a tip, providing a source of gas and electric power, and directing at least a portion of the gas to overcome the bias to separate the initiator from the tip, wherein a pilot arc is drawn between the initiator and the tip as the bias is overcome. A method of venting gas from a plasma arc torch is also provided, which comprises the steps of providing a source of gas and electric power, directing the gas and electric power to initiate a pilot arc, and venting at least a portion of the gas through head vent holes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
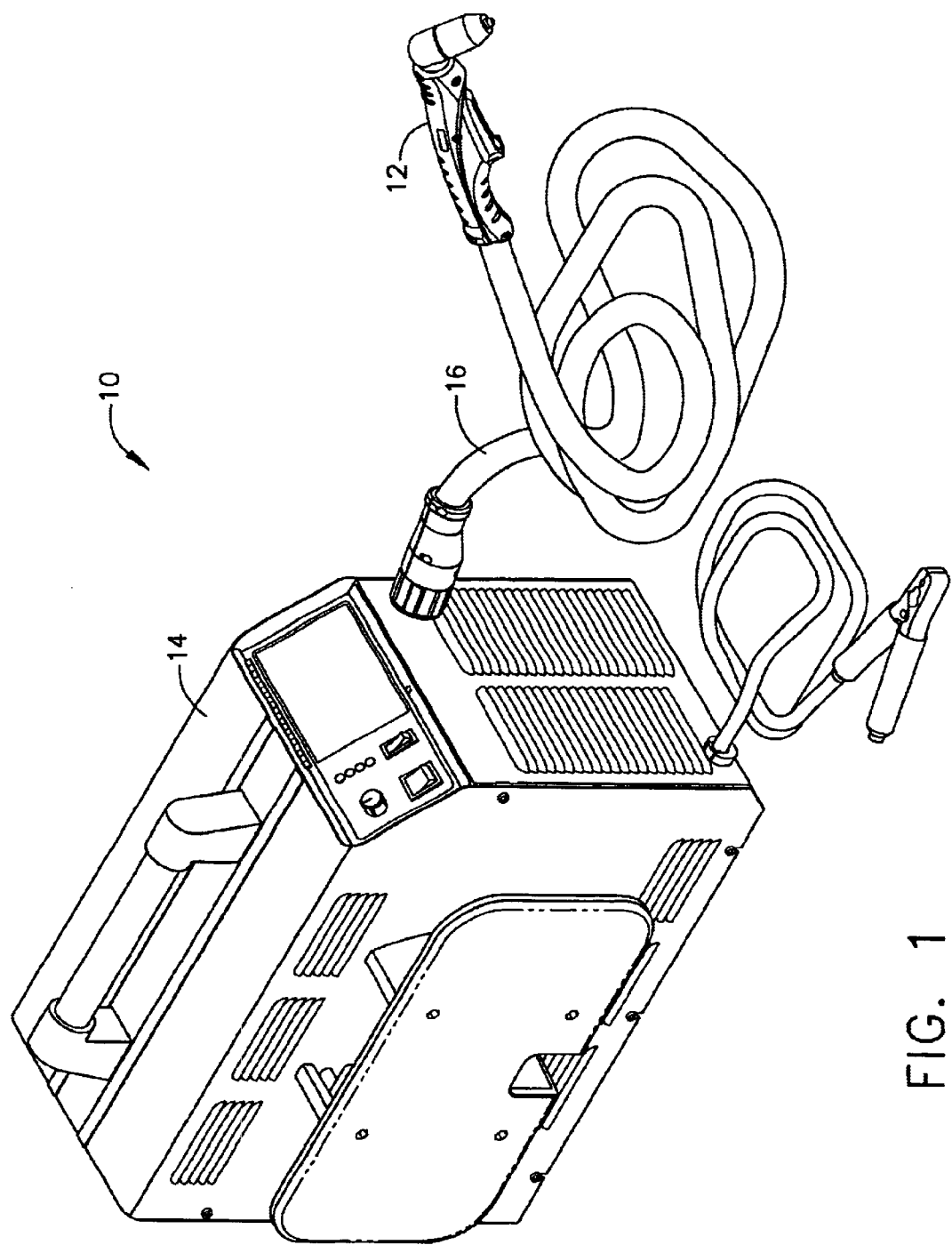
FIG. 1 is a perspective view of a manually operated plasma arc apparatus in accordance with the principles of the present invention.

Referring to the drawings, a contact start plasma arc torch according to the present invention is generally operable with a manually operated plasma arc apparatus as indicated by reference numeral 10 in FIG. 1. Typically, the manually operated plasma arc apparatus 10 comprises the contact start plasma arc torch 12 connected to a power supply 14 through a torch lead 16, which may be available in a variety of lengths according to a specific application. Further, the power supply 14 provides both gas and electric power, which flow through the torch lead 16, for operation of the plasma arc torch 12.

As used herein, a plasma arc apparatus, whether operated manually or automated, should be construed by those skilled in the art to be an apparatus that generates or uses plasma for cutting, welding, spraying, gouging, or marking operations, among others. Accordingly, the specific reference to plasma arc cutting torches, plasma arc torches, or manually operated plasma arc torches herein should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention. Additionally, the terms "biased" or "biasing" should not be construed as meaning an electrical bias or voltage as often used in the electrical field.

Figure 2:
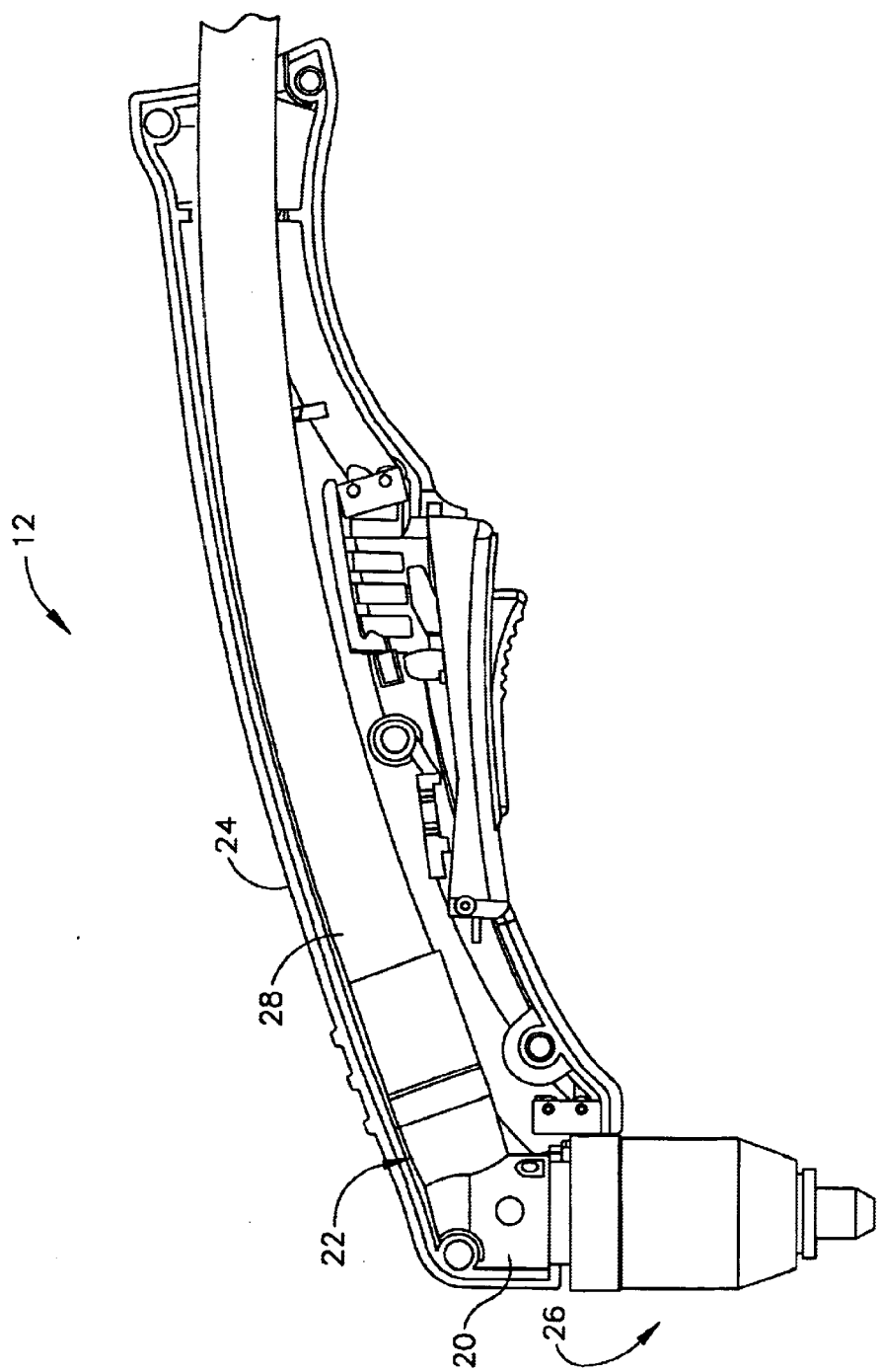
FIG. 2 is a side view of a torch head disposed within a plasma arc torch and constructed in accordance with the principles of the present invention.

Referring now to FIG. 2, a torch head for use in the contact start plasma arc torch 12 of the present invention is illustrated and generally indicated by reference numeral 20. As shown, the torch head 20 defines a proximal end 22 that is disposed within a handle 24 (one half of which is removed for clarity) of the plasma arc torch 12 and a distal end 26, to which a plurality of consumable components are secured, as described in greater detail below. The proximal end 22 is also adapted for connection to a torch lead 28, which provides both gas and electric power for operation of the contact start plasma arc torch 12. The connection to the torch lead 28 may comprise a quick disconnect such as that disclosed in copending application titled "Modular Plasma Arc Torch," filed on Feb. 26, 2002, and commonly assigned with the present application, the contents of which are incorporated herein by reference. Further, as described herein, proximal direction or proximally is the direction towards the proximal end 22, and distal direction or distally is the direction towards the distal end 26.

Figure 3:
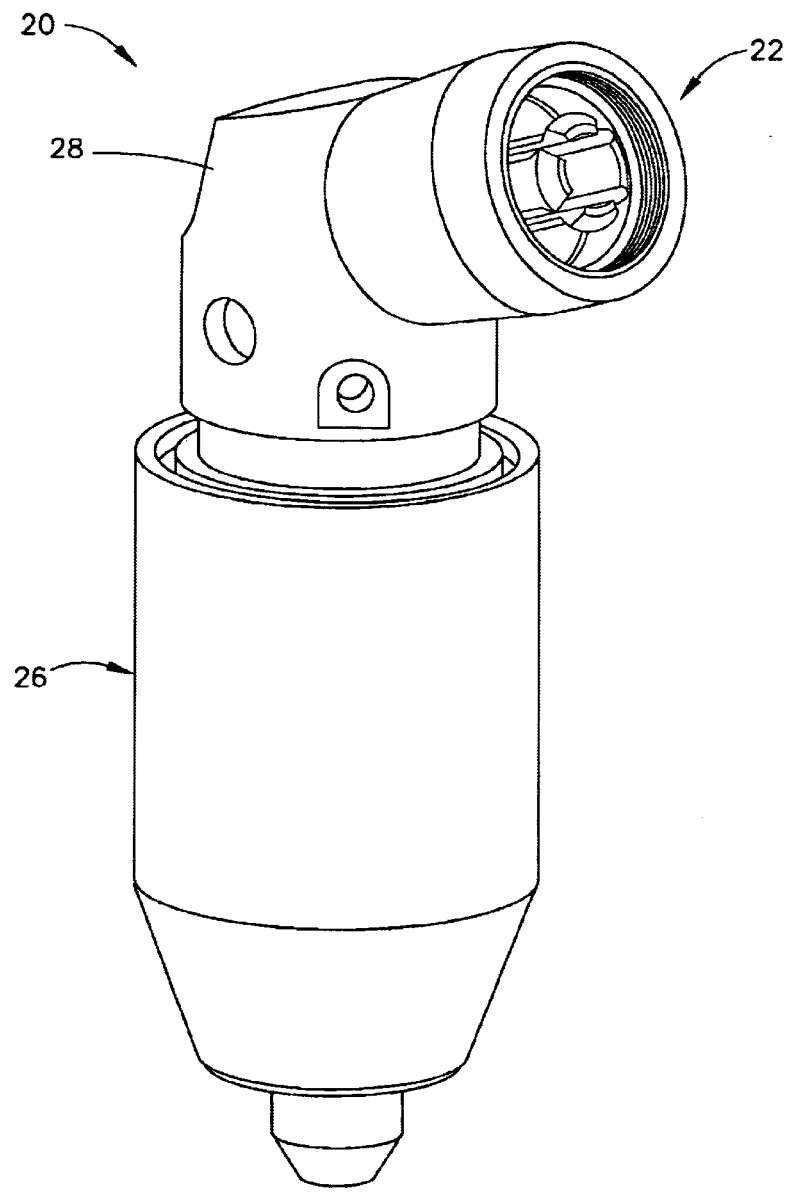
FIG. 3 is a perspective view of a torch head constructed in accordance with the principles of the present invention.
Figure 4:
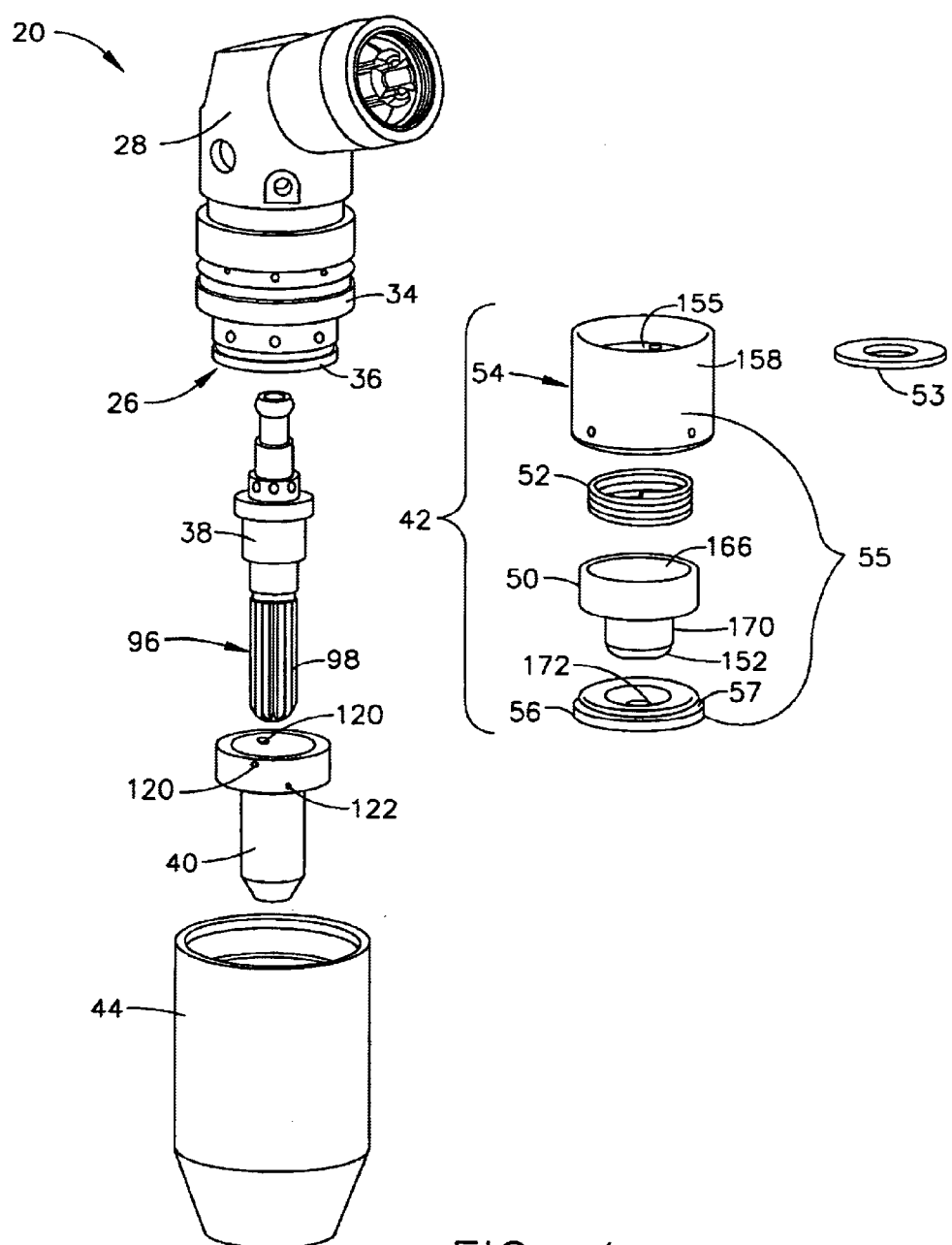
FIG. 4 is a perspective exploded view of a torch head and consumable components constructed in accordance with the principles of the present invention.
Figure 5:
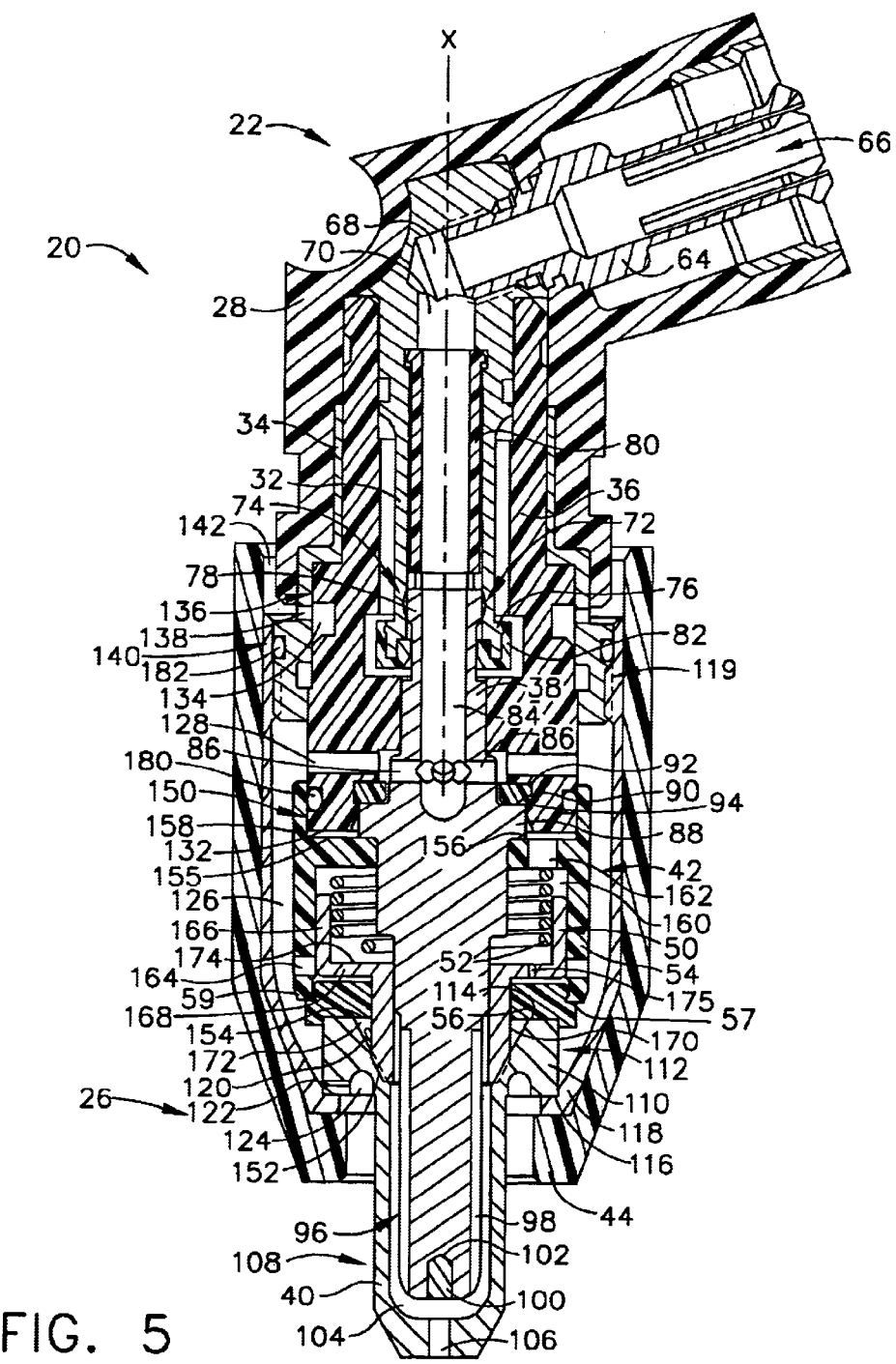
FIG. 5 is a cross-sectional view of a torch head and consumable components constructed in accordance with the principles of the present invention.

With reference to FIGS. 3 through 5, the torch head 20 further comprises a housing 28 in which fixed components of the torch head 20 are disposed. More specifically, the fixed components comprise a cathode 32 (FIG. 5) that has relatively negative potential, an anode 34 that has relatively positive potential, and an insulating body 36 that insulates the cathode 32 from the anode 34. The consumable components are generally secured to the distal end 26 of the torch head 20 and comprise an electrode 38, a tip 40, a start cartridge 42 that is used to draw a pilot arc as described below, and a shield cup 44 that secures the consumable components to the distal end 26 of the torch head 20 and further insulates the consumable components from the surrounding area during operation of the torch. The shield cup 44 also positions and orients the consumable components, e.g., the start cartridge 42 and the tip 40, relative to one another for proper operation of the torch when the shield cup 44 is fully engaged with the torch head 20.

As further shown, the start cartridge 42 comprises an initiator 50 and a coil spring 52 housed within a cartridge body 54 and a tip seat 56. Accordingly, the start cartridge 42 is preferably a single replaceable consumable component. Further, the cartridge body 54 and the tip seat 56 together are referred to as a cartridge assembly 55. In one form of the cartridge assembly 55, the cartridge body 54 is conductive while the tip seat 56 is insulative. In another form of the cartridge assembly 55, the cartridge body 54 is insulative, the tip seat 56 is insulative, and the cartridge assembly further comprises a conductive member 53, which may be a washer as shown, disposed at a proximal end of the cartridge body 54. The function and operation of the start cartridge 42, its components, and the fixed and other consumable components of the torch head 20 are described in greater detail below.

As shown in FIG. 5, the torch head 20 is illustrated with the cathode 32 secured within the housing 28, and the electrode 38 electrically connected to the cathode 32. The generally cylindrical insulating body 36 surrounds the cathode 32 and insulates the cathode 32 from the anode 34. As further shown, the cathode 32 abuts and electrically connects with a pin fitting 64 that is adapted for connection to the torch lead 28 (not shown). Accordingly, the cathode 32 is electrically connected to the negative side of the power supply 14 (not shown), and the anode 34 is in electrical communication with the positive side of the power supply. Further, the pin fitting 64 defines an internal bore 66 and the cathode 32 defines a central bore 70, which are in fluid communication for the supply of a working gas from the power supply 14 to the torch head 20. Although the cathode 32 and the pin fitting 64 are illustrated as being oriented at an angle relative to one another, the cathode 32 and the pin fitting 64 (or another adjacent component connected to the cathode 32) may alternately be colinear, or oriented 180 degrees relative to one another as commonly referred to in the art.

The electrode 38 defines a proximal connecting end 72 for connecting the electrode 38 with a connecting end 74 of the cathode 32. The connecting ends 72, 74 of the electrode 38 and the cathode 32 are configured for coaxial telescoping connection with one another as shown and described in coowned U.S. Pat. No. 6,163,008, which is incorporated herein by reference. To establish the connection between the cathode 32 and the electrode 38, the cathode connecting end 74 and the electrode connecting end 72 are formed with opposing detents generally designated 76 and 78, respectively. The detents 76 and 78 are interengageable with one another when the connecting end 74 of the electrode 38 is connected to the cathode 32 to inhibit axial movement of the electrode 38 away from the cathode 32. However, it should be understood that the electrode 38 may be connected to the cathode 32 in other conventional manners, such as by a threaded connection, without departing from the scope of the present invention.

Additionally, an insulating body 80 is disposed in the proximal end of the cathode 32, and an insulating cap 82 is mounted on the distal end of the cathode 32, which results in a relatively small area within the cathode central bore 70 exposed for contacting the electrode 38. Both the insulating body 80 and the insulating cap 82 are configured and positioned to inhibit electrical contact between an object other than the electrode 38 with the cathode 32 to reduce the risk of torch malfunction should such an object be inserted into the cathode central bore 70.

The electrode 38 defines a central bore 84 that extends distally from the connecting end 72 and is in fluid communication with the central bore 70 of the cathode 32 such that the working gas in the cathode central bore 70 is directed down through the central bore 84 of the electrode 38. The central bore 84 of the electrode 38 extends distally from the connecting end 72 into registry with gas distributing holes 86 that extend radially outward from the central bore 84 for exhausting working gas from the electrode 38. The electrode 38 further comprises an annular collar 88 that extends radially outward as shown and defines a proximal shoulder 90 distal to the gas distributing holes 86. The proximal shoulder 90 abuts a bushing 92 that is seated within an annular groove 94 formed in the insulating body 36. The bushing 92 is made of a durable material, preferably a polyimide such as Vespel®, so that the torch head 20 can withstand repeated installation of an electrode 38 without causing damage to the insulating body 36, which is more costly and difficult to replace. Further, a distal portion 96 of the electrode 38 defines a generally elongated, cylindrical shape with a fluted surface formed by longitudinally extending ridges 98. The electrode 38 of the illustrated embodiment is constructed of copper or a copper alloy and preferably comprises an emissive insert 100, such as hafnium, secured within a recess 102 at the distal end of the electrode 38.

The generally hollow tip 40, also commonly referred to as a nozzle, is mounted over the distal portion 96 of the electrode 38. The tip 40 is in a radially and longitudinally spaced relationship with the electrode 38 to form a primary gas passage 104, which is also referred to as an arc chamber or plasma chamber. A central exit orifice 106 of the tip 40 communicates with the primary gas passage 104 for exhausting ionized gas in the form of a plasma stream from the tip 40 and directing the plasma stream down against a workpiece. The tip 40 further comprises a hollow, generally cylindrical distal portion 108 and an annular flange 110 at a proximal end 112. The annular flange 110 defines a generally flat, proximal face 114 that seats against and seals with the tip seat 56 of the start cartridge 42, and a distal face 116 adapted to seat within and make electrical contact with a conductive insert 118 disposed within the shield cup 44. The conductive insert 118 is further adapted for connection with the anode 34, preferably using a threaded connection 119 such that electrical continuity between the positive side of the power supply is maintained. Accordingly, the tip 40 is in electrical contact with the positive, or anode, side of the power supply through the conductive insert 118.

The tip 40 further defines a plurality of swirl holes 120 (further shown in FIG. 4) offset from a center of the tip 40 and positioned around and through the annular flange 110. Additionally, the tip 40 preferably defines a plurality of secondary gas holes 122 (also shown in FIG. 4) extending radially through the annular flange 110 and into an annular recess 124 on the distal face 116. Accordingly, the tip 40 regulates the plasma gas to form a plasma stream in addition to the secondary gas to stabilize the plasma stream, which is further shown and described in co-pending application titled "Tip Gas Distributor," filed on Feb. 26, 2002, and commonly assigned with the present application, the contents of which are incorporated herein by reference. Further, the tip 40 is preferably made of a copper or copper alloy material.

The shield cup 44 surrounds the distal end 26 of the torch head 20 and generally secures and positions the consumable components therein, in addition to insulating an area surrounding the torch head 20 from the conductive components during operation and while the power supply 14 (not shown) supplies electric power to the torch head 20. When secured to the torch head 20 through the threaded connection 119, a primary gas chamber 126 is formed between the conductive insert 118 of the shield cup 44 and the insulating body 36, the start cartridge 42, and the tip 40, through which the primary working gas flows during operation of the torch as described in greater detail below. Additionally, the shield cup 44 is preferably made of a non-conductive, heat insulating material, such as phenolic or ceramic.

Figure 6:
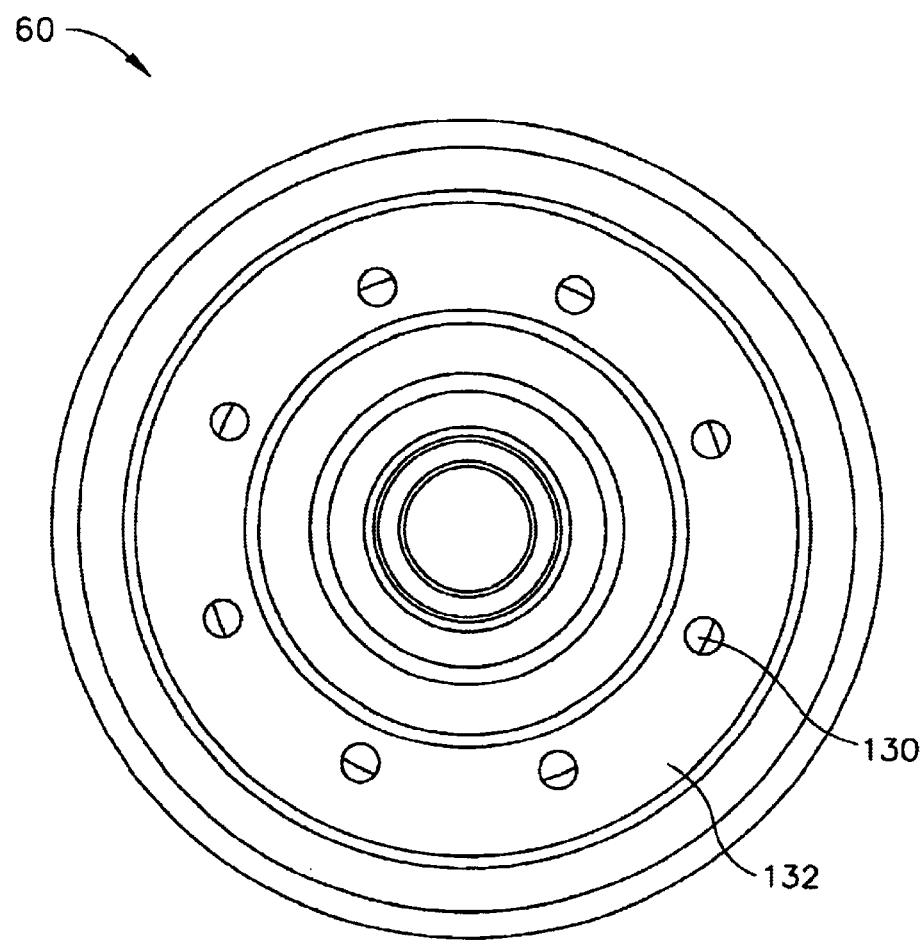
FIG. 6 is a bottom view of a distal end of a torch head constructed in accordance with the principles of the present invention.

The insulating body 36 further defines a plurality of radial gas distributing holes 128 that are in fluid communication with the electrode gas distributing holes 86 and also with the primary gas chamber 126. Referring also to FIG. 6, the insulating body 36 further defines a plurality of axial vent holes 130 extending through a distal face 132, which are in fluid communication with a set of radial vent holes 134 defined in a proximal section 136 of the insulating body 36. The radial vent holes 134 are in further fluid communication with a set of radial vent holes 138 defined in a distal section 140 of the anode member 34, which are in fluid communication with an opening 142 near the proximal end of the shield cup 44, formed between the shield cup 44 and the torch head housing 28, which is exposed to atmosphere as shown. Accordingly, gas is vented through the series of vent holes in the insulating body 36, the anode 34, and the shield cup 44 during operation of the torch is described in greater detail below. Further, the insulating body 36 is preferably made of a non-conductive, heat insulating material, such as phenolic or ceramic, and the anode member 34 is made of a conductive material such as brass or a brass alloy.

Figure 7A:
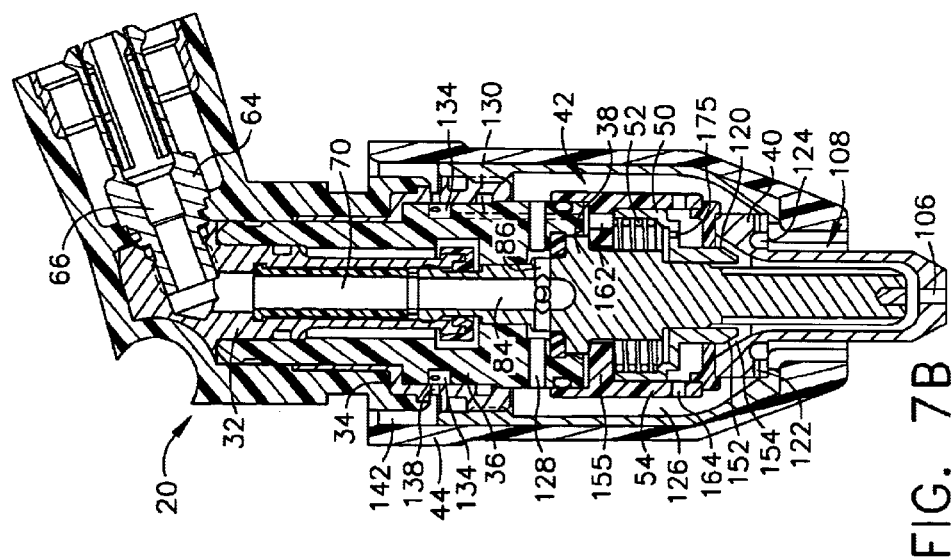
FIG. 7A is a cross-sectional view of a torch head in an idle mode and constructed in accordance with the principles of the present invention.
Figure 7B:
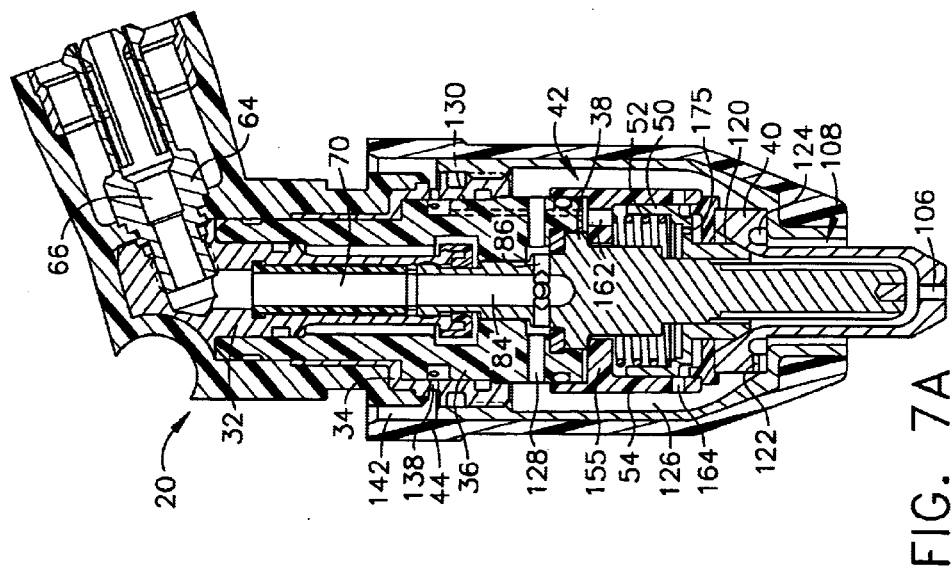
FIG. 7B is a cross-sectional view of a torch head in a pilot mode and constructed in accordance with the principles of the present invention.

Referring to FIGS. 7A and 7B, the start cartridge 42 in accordance with the principles of the present invention is operable between an idle mode (FIG. 7A) and a pilot mode (FIG. 7B) of the torch. In the idle mode, the initiator 50 is in electrical contact with the electrode 38 and is resiliently biased into contact with the tip 40. The initiator 50 preferably defines a beveled distal contact surface 152 that is in contact with a conical interior surface 154 of the tip 40. Further, the initiator 50 is resiliently biased into contact with the tip 40 with any suitable biasing member or means, such as a spring, or an elastic or elastomeric member, among others. In the preferred embodiment as shown, the biasing member is the coil spring 52, which is sufficiently stiff that gas pressure from the gas supply overcomes the spring force to separate the initiator 50 from the tip 40. Further, the initiator 50 and the coil spring 52, along with the cartridge body 54 and the tip seat 56, are preferably part of a replaceable start cartridge 42. Accordingly, the tip seat 56 defines an annular shoulder 57 that engages an annular flange 59 of the cartridge body 54, wherein the connection between the annular shoulder 57 and the annular flange 59 may be press fit or adhesively bonded, among other methods commonly known in the art.

As further shown, the cartridge body 54 comprises a recessed end wall 155 that abuts a distal shoulder 156 of the electrode 38, and a generally cylindrical sidewall 158. When fully assembled, a chamber 160 is defined within the start cartridge 42, in which the coil spring 52 and a portion of the initiator 50 are disposed. The cartridge body 54 further defines axial vent holes 162 that extend through the recessed end wall 155 and that are in fluid communication with the chamber 160 and with the axial vent holes 130 in the distal face 132 of the insulating body 36 as previously described. Additionally, a series of radial gas holes 164 are disposed around the sidewall 158, which direct a portion of the working gas into the start cartridge 42 to overcome the bias of coil spring 52 to move the initiator 50 away from the tip 40 and against the bias of the coil spring 52 as described in greater detail below.

The initiator 50 defines a generally cylindrical portion 166, an annular flange 168, and a tubular portion 170 that defines the beveled contact surface 152. As shown, the proximal section of the tubular portion 170 is in electrical contact with the electrode 38, and the distal section of the tubular portion 170 projects distally through a central aperture 172 of the tip seat 56. Further, the coil spring 52 is disposed within the cylindrical portion 166 and is seated against a proximal face 174 of the initiator. The proximal face 174 further defines axial vent holes 175, which are in fluid communication with the chamber 60 and also with the cartridge body axial vent holes 162, such that the gas in the chamber is vented from the torch head 20 as further described below. Preferably, the initiator 50 is made of a conductive material such as copper or a copper alloy, the coil spring 52 is a steel material, the cartridge body 54 is a conductive material such as brass, and the tip seat 56 is a nonconductive material such as a polyimide. Alternately, as previously set forth, the cartridge body 54 may be insulative, or nonconductive, while the tip seat 56 is insulative.

The initiator 50 according to the present invention is free from fixed connection to the electrode 38 and the cathode 32 (i.e., the cathode side) and the anode 34, the conductive insert 118, and the tip 40 (i.e., the anode side). The term "free from fixed connection" as used herein means that relative movement is possible between the initiator 50 and the cathode side and the anode side in at least one direction, such as axially and/or radially. For example, in the illustrated embodiment, the initiator 50 is free to move axially along a central longitudinal axis X of the torch head 20 within the chamber 160 of the start cartridge 42. More particularly, the initiator 50 is axially movable relative to the electrode 38 and the tip 40 between a first, distal position (FIG. 7A) corresponding to the idle mode of the torch, and a second, proximal position (FIG. 7B) corresponding to the pilot mode of the torch. However, it should be understood that the initiator 50 may be free to move radially relative to the cathode side and the anode side. It is also understood that the initiator 50 may instead be stationary within the torch and either the cathode side, the anode side, or both may be free to move, axially and/or radially, relative to the initiator 50.

As further shown, a plurality of o-rings and associated o-ring grooves are disposed within the torch head 20 to seal the gas flow during operation of the torch. More specifically, an o-ring 180 is disposed between the insulating body 36 and the start cartridge 42 at the distal end 150 of the insulating body 36. Additionally, an o-ring 182 is disposed between the anode 34 and the conductive insert 118 of the shield cup 44 near the distal section 140 of the anode 34. Accordingly, the o-rings 180 and 182 seal the gas flow within the torch head 20 during operation.

Referring to FIGS. 7A and 7B, which correspond with the idle mode of the torch and the pilot mode of the torch, respectively, the operation of the start cartridge 42, and more specifically the initiator 50, to initiate a pilot arc and to operate the torch according to a method of the present invention is shown and described in greater detail. As illustrated, the torch head 20 is connected to a supply of gas and electric power, preferably through the pin fitting 64 as previously described. The application of electric power causes current to between the electrode 38, the initiator 50, and to the tip 40, which are all in direct electrical connection. When the gas supply is activated, a working gas flows through the internal bore 66 of the pin fitting 64 and through the central bores 70 and 84 of the cathode 32 and the electrode 38, respectively. The gas then flows through gas distributing holes 86 of the electrode 38 and through gas distributing holes 128 of the insulating body 36, which causes the gas flow distally into the primary gas chamber 126. The gas then partially flows through the radial gas holes 164 of the start cartridge 42, which causes the initiator 50 to move proximally away from the tip 40, as shown in FIG. 7B in the pilot mode of the torch. Accordingly, the gas pressure is sufficiently high to overcome the bias of the coil spring 52. As the initiator 50 moves proximally away from the tip 40, a pilot arc is drawn between the initiator 50 and the tip 40, and more specifically between the conical interior surface 154 and the beveled distal contact surface 152 which are configured relatively parallel to one another as shown.

Further to the gas flowing partially through the radial gas holes 164 to move the initiator 50, the gas continues to flow distally and into swirl holes 120 as the plasma gas and also into the secondary gas holes 122 as the secondary gas. As the plasma gas, the gas swirls in the gap between the initiator 50 and the tip 40 and is ionized by the pilot arc formed between the initiator 50 and the tip 40. As shown, the swirl holes 120 are preferably positioned proximally from the area where the conical interior surface 154 of the initiator 50 contacts the beveled distal contact surface 152 of the tip 40, in order to provide a more stable plasma stream. However, the swirl holes 120 may be positioned distally from the area where the initiator 50 contacts the tip 40 and remain within the scope of the present invention. As a result of the gas swirling and pilot arc creation, the ionized gas is blown out the central exit orifice 106 of the tip 40 in the form of a plasma stream. Additionally, the gas that flows through the secondary gas holes 122 flows into the annular recess 124 and then distally along the generally cylindrical distal portion 108 of the tip 40. As a result, the secondary gas forms a cylindrical gas envelope to stabilize the plasma stream that is blown from the central exit orifice 106. The tip 40 with the swirl holes 120 and the secondary gas holes 122 is further described in the copending application titled "Tip Gas Distributor," filed Feb. 26, 2002, and commonly assigned with the present application, the contents of which are incorporated herein by reference.

As further shown, the gas that flows into the start cartridge 42 to move the initiator 50 proximally away from the tip 40 is vented through the axial vent holes 175 of the initiator, through axial vent holes 162 in the annular end wall 155 of the cartridge body 54, and proximally through the axial vent holes 130 (shown dashed) in the insulating body 36. The gas then flows through the radial vent holes 134 in the insulating body 36, through the radial vent holes 138 in the anode 34, and out through the opening 142 at the proximal end of the shield cup 44. Accordingly, the torch head 20 according to the present invention incorporates head vent holes (i.e., radial vent holes 134, 138) to vent gas from the torch head 20, which facilitates a more rapid restart of the torch after the gas and electric power are turned off. When the gas and electric power are turned off and the gas is vented as previously described, the force of the coil spring 52 causes the initiator 50 to move distally towards the tip 40 such that the conical interior surface 154 and the beveled distal contact surface 152 come into contact, wherein the plasma arc torch is in the idle mode.

Figure 7C:
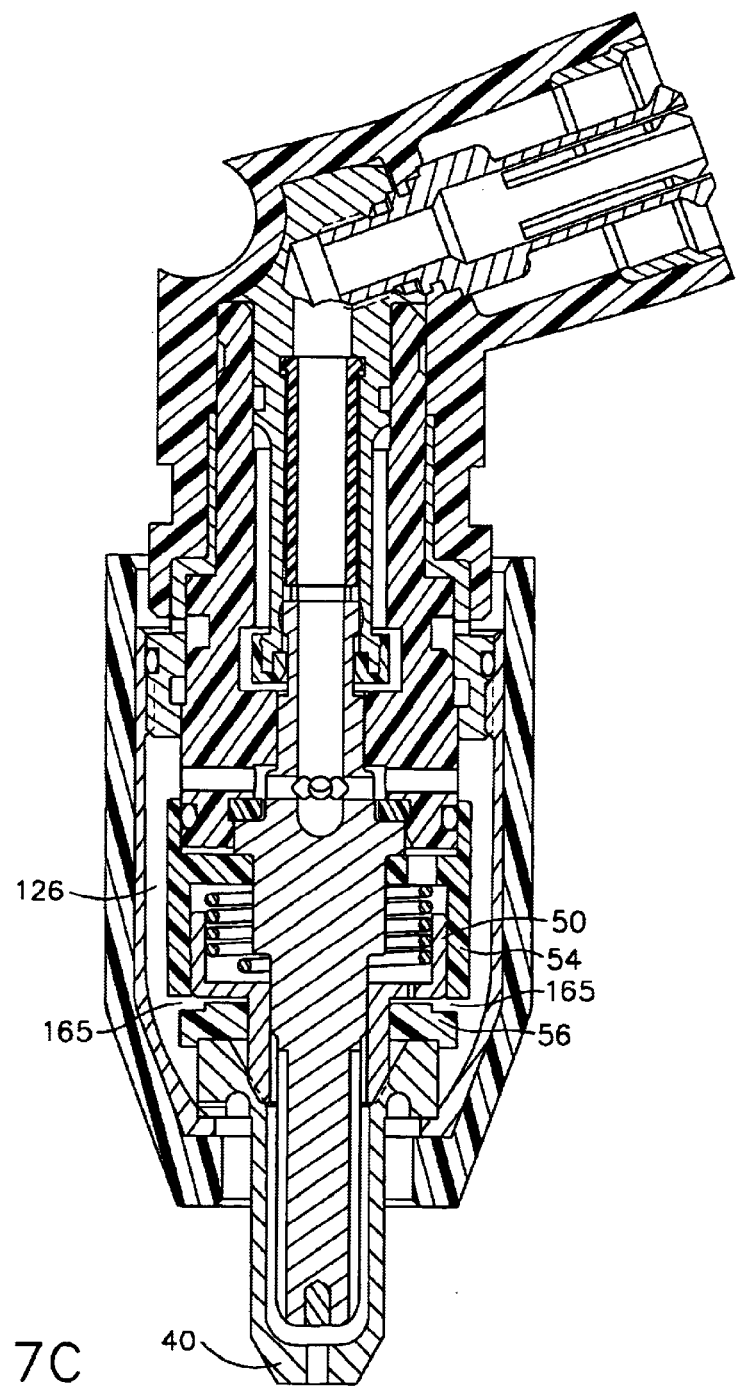
FIG. 7C is a cross-sectional view of a torch head illustrating gas passages through a second embodiment of a start cartridge and constructed in accordance with the principles of the present invention.

Alternately, as shown in FIG. 7C, gas passages 165 may be formed between the cartridge body 54 and the tip seat 56 rather than radial gas holes 164 through the cartridge body 54 as previously described. Accordingly, the gas within primary gas chamber 126 partially flows through the gas passages 165, which causes the initiator 50 to move proximally away from the tip 40 and draw a pilot arc as previously described. Additionally, as used herein, whether in a singular or plural form, the term "hole" may also be construed as being an aperture or opening of a different shape through the various components as described rather than the circular or cylindrical shapes as illustrated throughout the present application.

As described herein, the initiator 50 is shown and described as engaging the tip 40 in the idle mode of the torch to provide an electrically conductive path between the anode side of the power supply and the cathode side of the power supply. However, it should be understood that the initiator 50 need not engage the anode side or the cathode side in the idle mode of the torch, as long as the initiator 50 is positioned sufficiently close to at least one of the cathode side, e.g., electrode, and the anode side, e.g., tip, to provide an electrically conductive path between the positive and negative sides of the power supply. Accordingly, an arc may be formed between the initiator 50 and the anode side or the cathode side in the idle mode of the torch, but such an arc is not considered to be a pilot arc as that term is commonly understood and as used herein because the arc is not adapted for initiating operation of the torch by exhausting working gas from the torch in the form of a plasma stream.

Rather, any spacing between the initiator 50 and the anode side or the cathode side in the idle mode of the torch would be relatively small compared to the spacing therebetween in the pilot mode of the torch such that gas flow between the initiator 50 and the anode side or cathode side is substantially restricted and is therefore incapable of blowing any arc formed therebetween in the idle mode of the torch down toward the exit orifice of the tip to exhaust working gas from the torch in the form of a plasma stream. Therefore, reference herein to a pilot arc formed in the torch upon movement of the initiator 50 toward its proximal position corresponding to the pilot mode of the torch means an arc formed between the initiator 50 and at least one of the cathode side and the anode side when the initiator 50 is sufficiently spaced from the cathode side and/or the anode side that the arc formed therebetween can be blown through the exit orifice of the tip for initiating operation of the torch, such that working gas is exhausted from the torch in the form of a plasma stream.

Furthermore, the electrode 38 and the tip 40 are shown and described as being secured in the torch head 20 in a fixed relationship with each other as the initiator 50 moves between its proximal and distal positions. However, the electrode 38, the tip 40, or both may move relative to one another and remain within the scope of the present invention, and the initiator 50 may or may not be secured against movement within the torch head 20, as long as the initiator 50 is free from fixed connection with the electrode 38 and the tip 40 in at least one direction so that the initiator 50 can assume different positions relative to the electrode 38 and the tip 40 in the idle and pilot modes of the torch.

Moreover, while the initiator 50 is moved between its distal and proximal positions pneumatically, such as by a force generated by pressurized gas (e.g., the primary working gas flowing through the start cartridge 42), it should be understood that the initiator 50 may alternately be mechanically driven between its distal and proximal positions without departing from the scope of the present invention. Further, an initial supply of gas may be used to bias the initiator 50 into electrical contact with the tip 40 when required, such as when the start cartridge 42 does not comprise a coil spring 52 and the initiator 50 is resiliently biased into contact with the tip 40 using, for example, gravity. The supply of gas may be initiated using a gas control device as shown and described in copending applications titled "Torch Handle Gas Control" and "Plasma Arc Torch Trigger System," filed Feb. 26, 2002, which are commonly assigned with the present application and the contents of which are incorporated herein by reference. Additionally, as used herein, the term "resiliently biased" should not be limited to the use of a coil spring 52 as shown and described. Rather, the term "resiliently biased" may comprise, by way of example, a canted coil spring, gravity, gas pressure, or other methods commonly known in the art.

In addition to application within a contact start torch as shown and described herein, the start cartridge 42 according to the present invention may also be employed within a non-contact start, or high frequency/high voltage, torch. The operation of the start cartridge 42 in both a contact start and a non-contact start torch is disclosed in copending application titled "Dual Mode Torch," filed Feb. 26, 2002, and commonly assigned with the present application, the contents of which are incorporated herein by reference.

Figure 8:
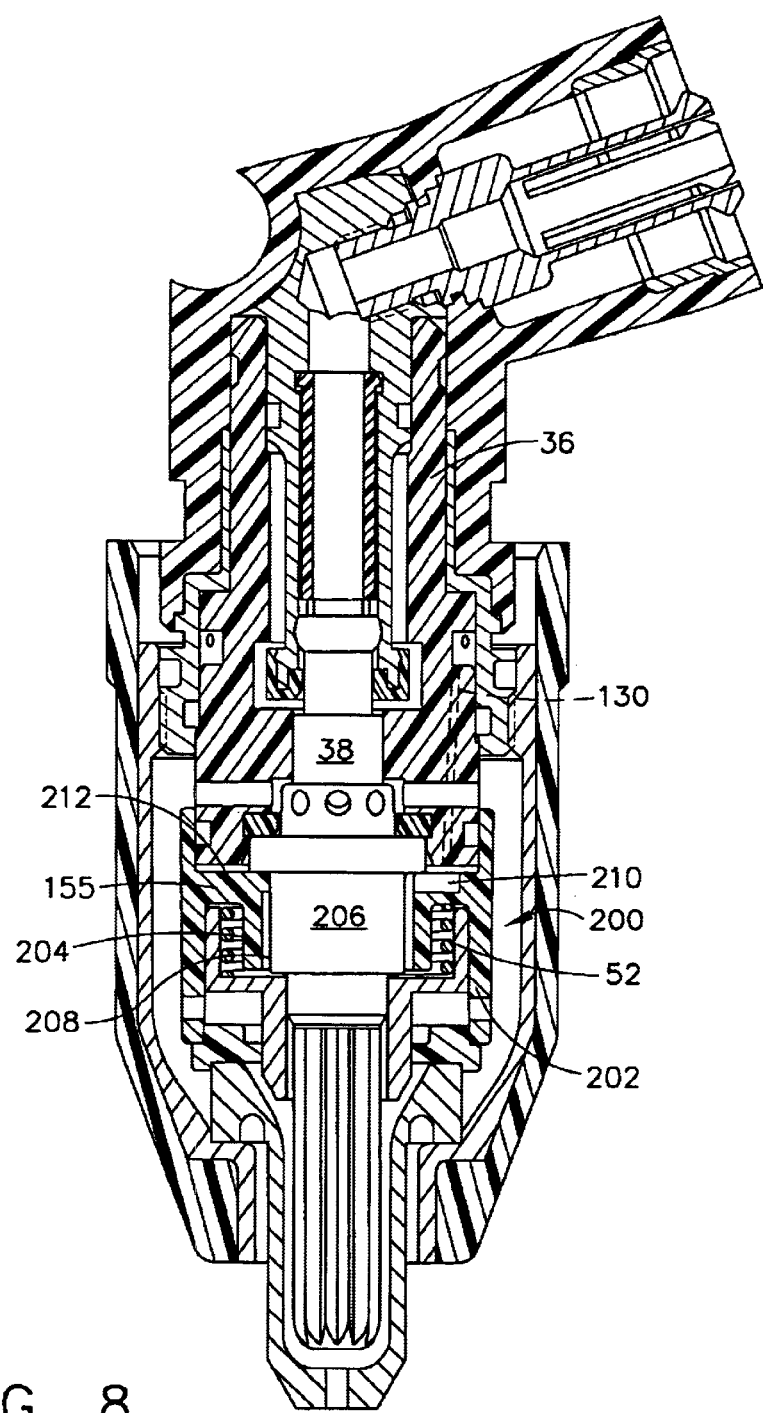
FIG. 8 is a cross-sectional view of a torch head comprising a third embodiment of a start cartridge and constructed in accordance with the principles of the present invention.
Figure 9:
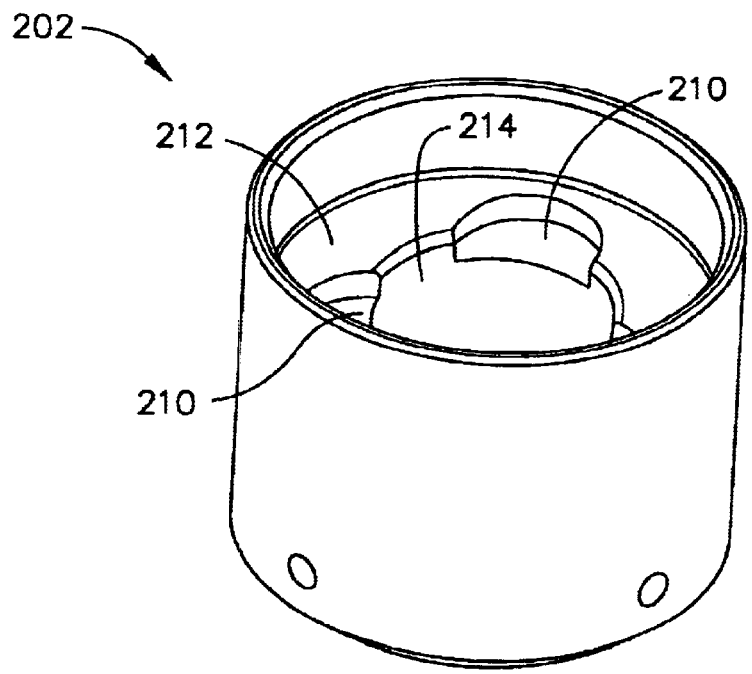
FIG. 9 is an upper perspective view of a cartridge body comprising gas passages and constructed in accordance with the principles of the present invention.
Figure 10:
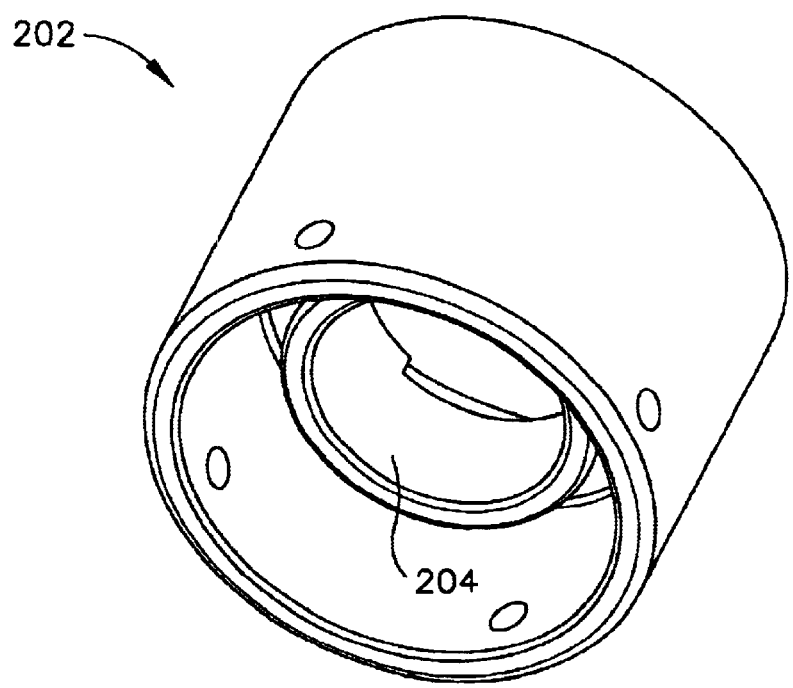
FIG. 10 is a lower perspective view of the cartridge body comprising gas passages in accordance with the principles of the present invention.
Figure 11:
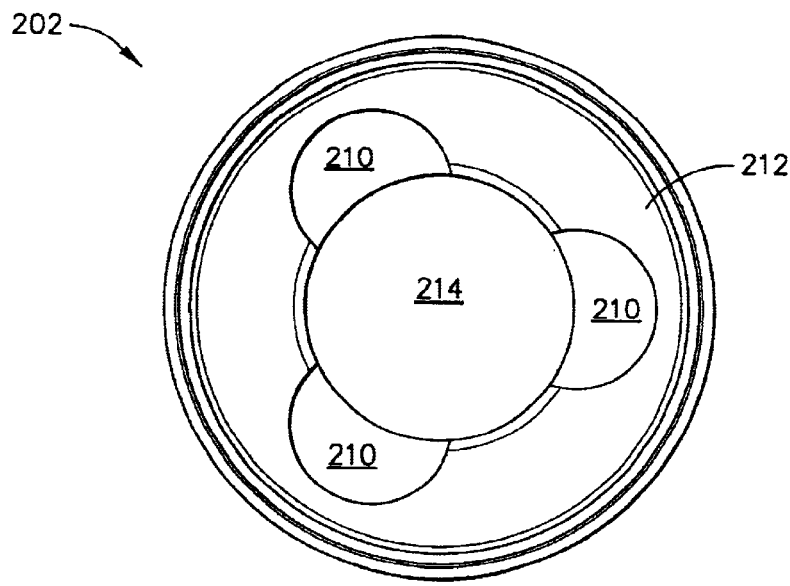
FIG. 11 is a top view of the cartridge body comprising gas passages in accordance with the principles of the present invention.
Figure 12:
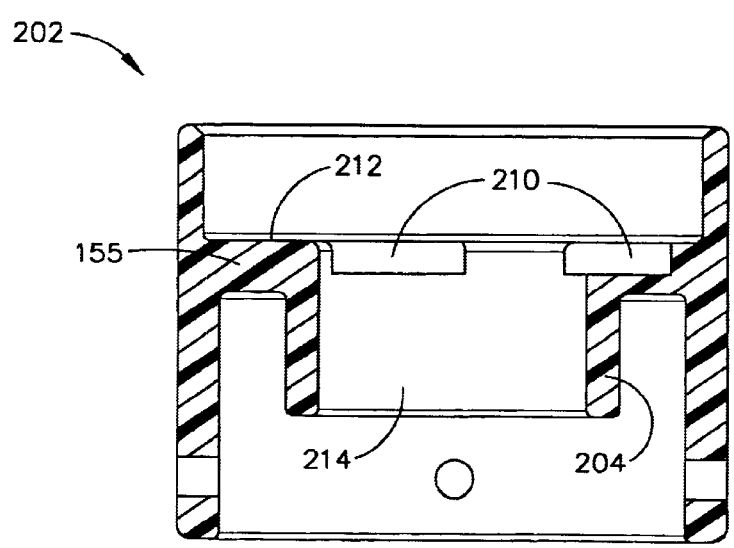
FIG. 12 is a cross-sectional view of the cartridge body comprising gas passages in accordance with the principles of the present invention.

Referring now to FIG. 8, another form of the present invention is illustrated, wherein an alternate start cartridge 200 is employed within the plasma arc torch 12 (not shown). The start cartridge 200 is similar in construction and operation as the previous start cartridge 42, however, the start cartridge 200 comprises a cartridge body 202 that further comprises an internal annular flange 204 that surrounds a central portion 206 of the electrode 38. The internal annular flange 204 extends distally from the recessed end wall 155 along the central portion 206, wherein a relatively small gap 208 is defined between the internal annular flange 204 and the central portion 206 of the electrode 38. Additionally, the cartridge body 202 defines at least one gas passage 210 formed on a proximal face 212 of the recessed end wall 155. Accordingly, the gas used to overcome the bias of the coil spring 52 within the start cartridge 200 is vented through the gap 208, the gas passage 210, and through the axial vent holes 130 (shown dashed) in the insulating body 36 as previously described. In operation, therefore, the internal annular flange 204 provides venting and additional cooling for the electrode 38.

With reference to FIGS. 9 through 12, the cartridge body 202 is further illustrated with the internal annular flange 204 and a plurality of gas passages 210 formed on the proximal face 212 of the recessed end wall 155. As shown, the gas passages 210 preferably define a partial cylindrical configuration that are in fluid communication with a central bore 214 extending through the cartridge body 202. Additionally, a total of three (3) gas passages 210 are employed in one form of the present invention, however, one or more gas passages 210 may be used according to specific operational requirements.

Figure 13:
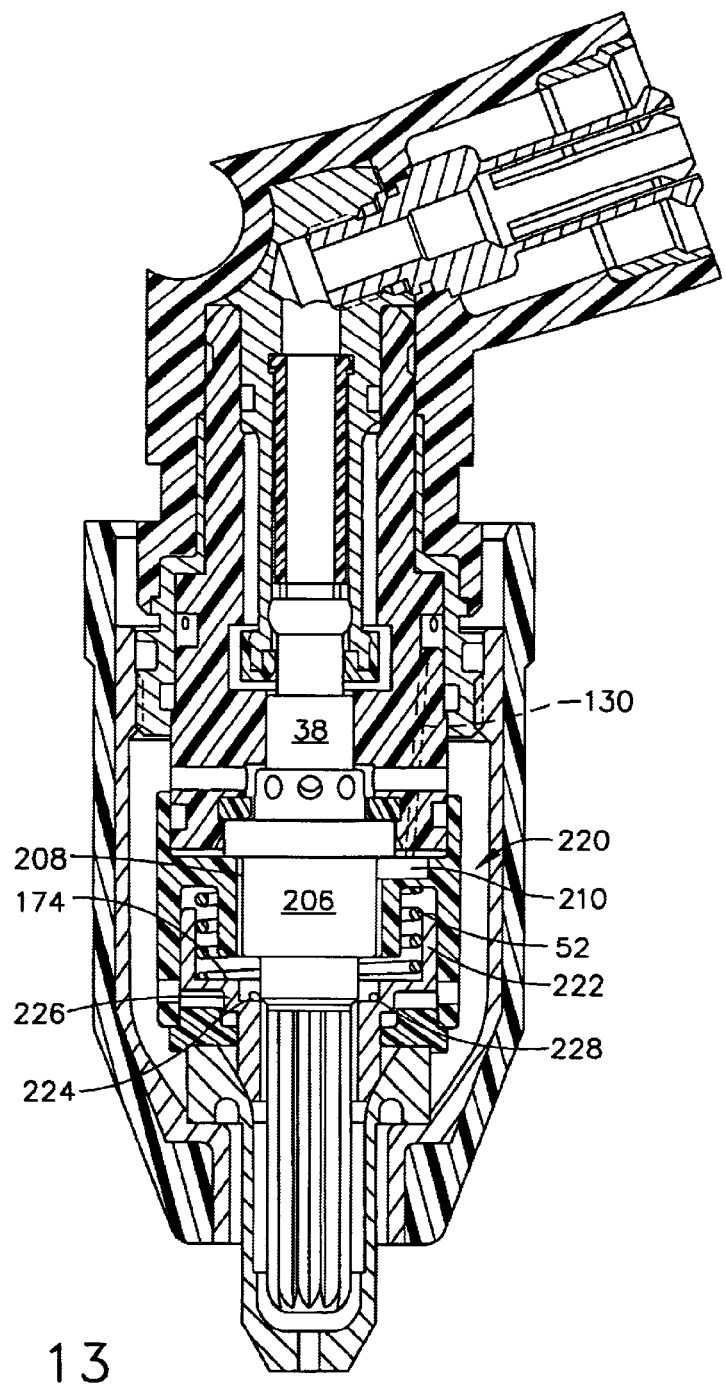
FIG. 13 is a cross-sectional view of a torch head comprising a second embodiment of an initiator and constructed in accordance with the principles of the present invention.
Figure 14:
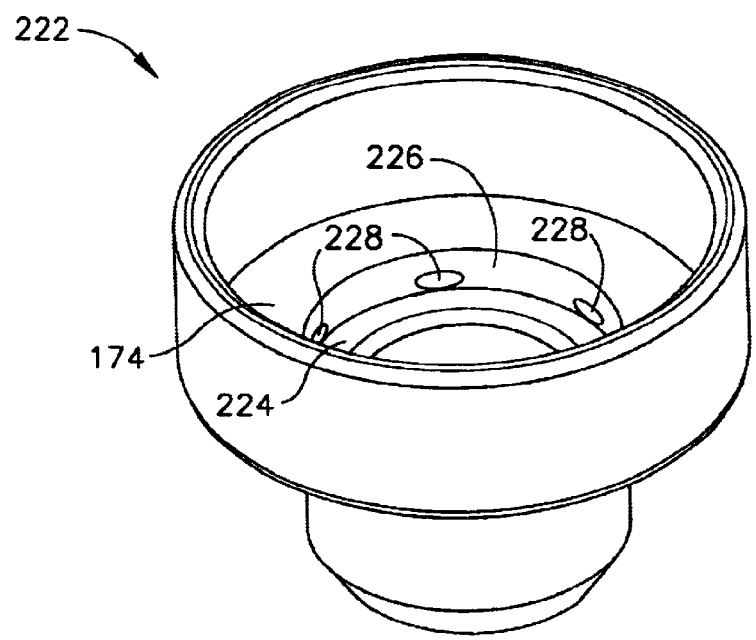
FIG. 14 is an upper perspective view of an initiator comprising vent holes and constructed in accordance with the principles of the present invention.
Figure 15:
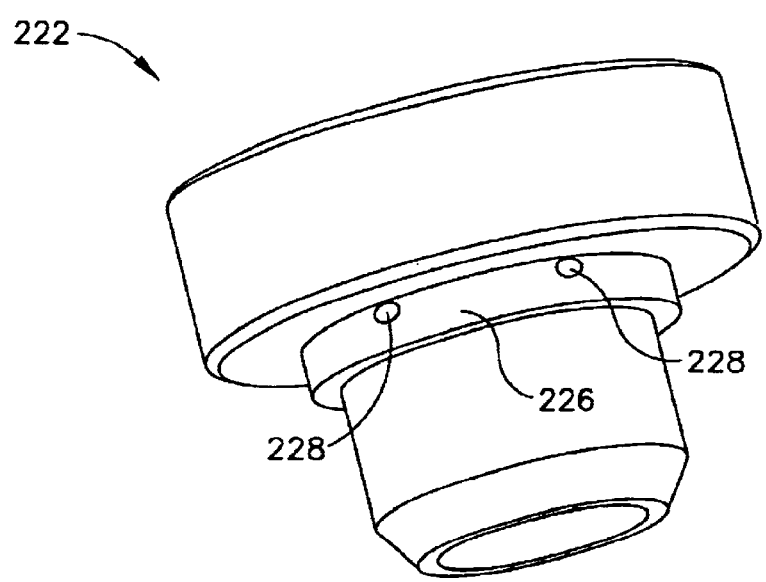
FIG. 15 is a lower perspective view of the initiator comprising vent holes in accordance with the principles of the present invention.
Figure 16:
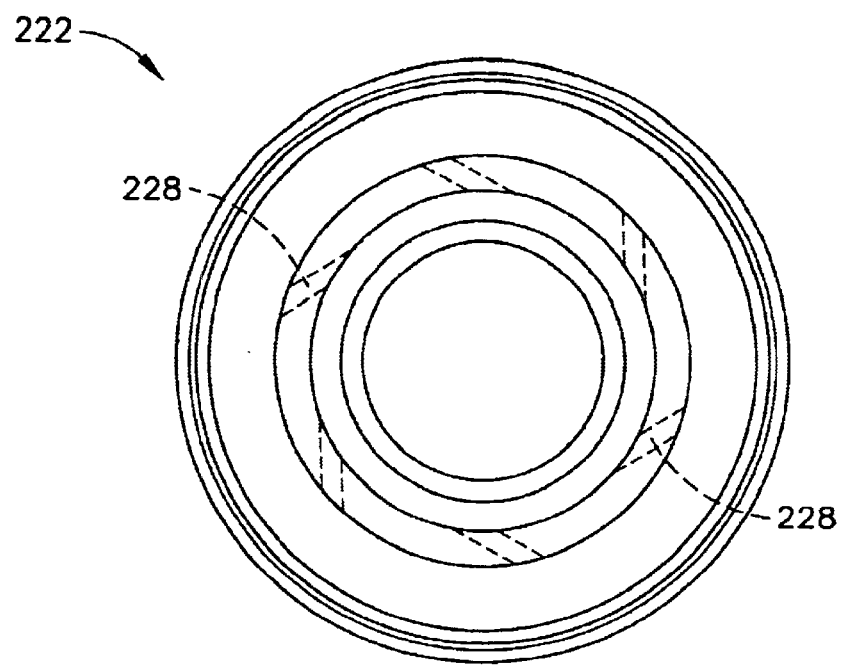
FIG. 16 is a top view of the initiator comprising vent holes in accordance with the principles of the present invention.
Figure 17:
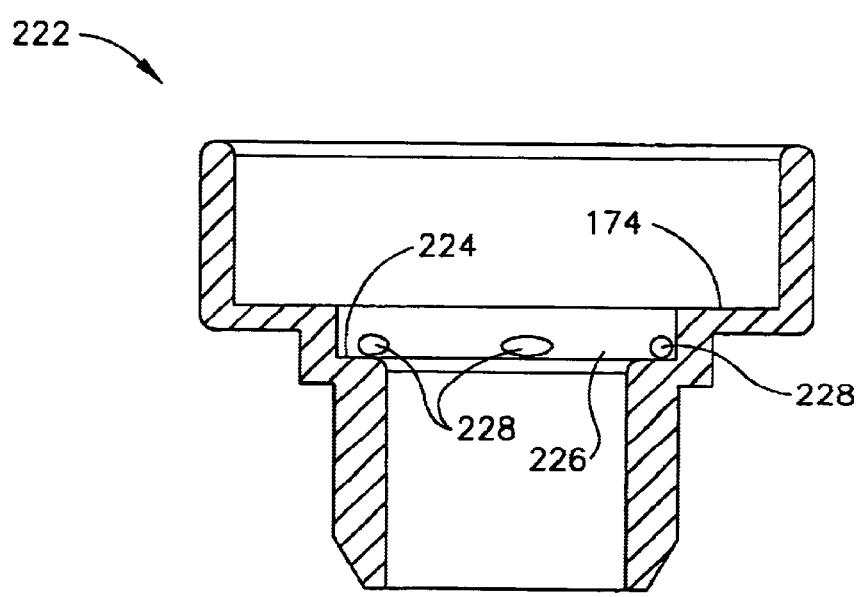
FIG. 17 is a cross-sectional view of the initiator comprising vent holes in accordance with the principles of the present invention.

Referring to FIG. 13, yet another form of the present invention is illustrated, wherein an alternate start cartridge 220 is employed within the plasma arc torch 12 (not shown). The start cartridge 220 is similar in construction and operation as the start cartridge 200 previously described, however, the start cartridge 220 further comprises an initiator 222 that defines a recessed proximal face 224 and an annular wall 226 formed between the proximal face 174 and the recessed proximal face 224. As further sown, at least one vent hole 228 is formed through the annular wall 226 such that the gas that is used to overcome the bias of the coil spring 52 within the start cartridge 220 is vented through the vent hole 228, and then through the gap 208, the gas passage 210, and through the axial vent holes 130 (shown dashed) in the insulating body 36 as previously described. Accordingly, the vent hole 228 provides venting and additional cooling to the central portion 206 of the electrode 38.

As shown in FIGS. 14 through 17, the initiator 222 is further illustrated with the recessed proximal face 224 and a plurality of vent holes 228 formed through the annular wall 226. As shown, the vent holes 228 are preferably positioned off-center from the initiator 222, and a total of six (6) vent holes 228 are employed in one form of the present invention, although one or more vent holes 228 may be used according to specific operational requirements. Further, the vent holes 228 are in fluid communication with an interior portion of the initiator 222 such that the gas may be vented as previously described.

Figure 18:
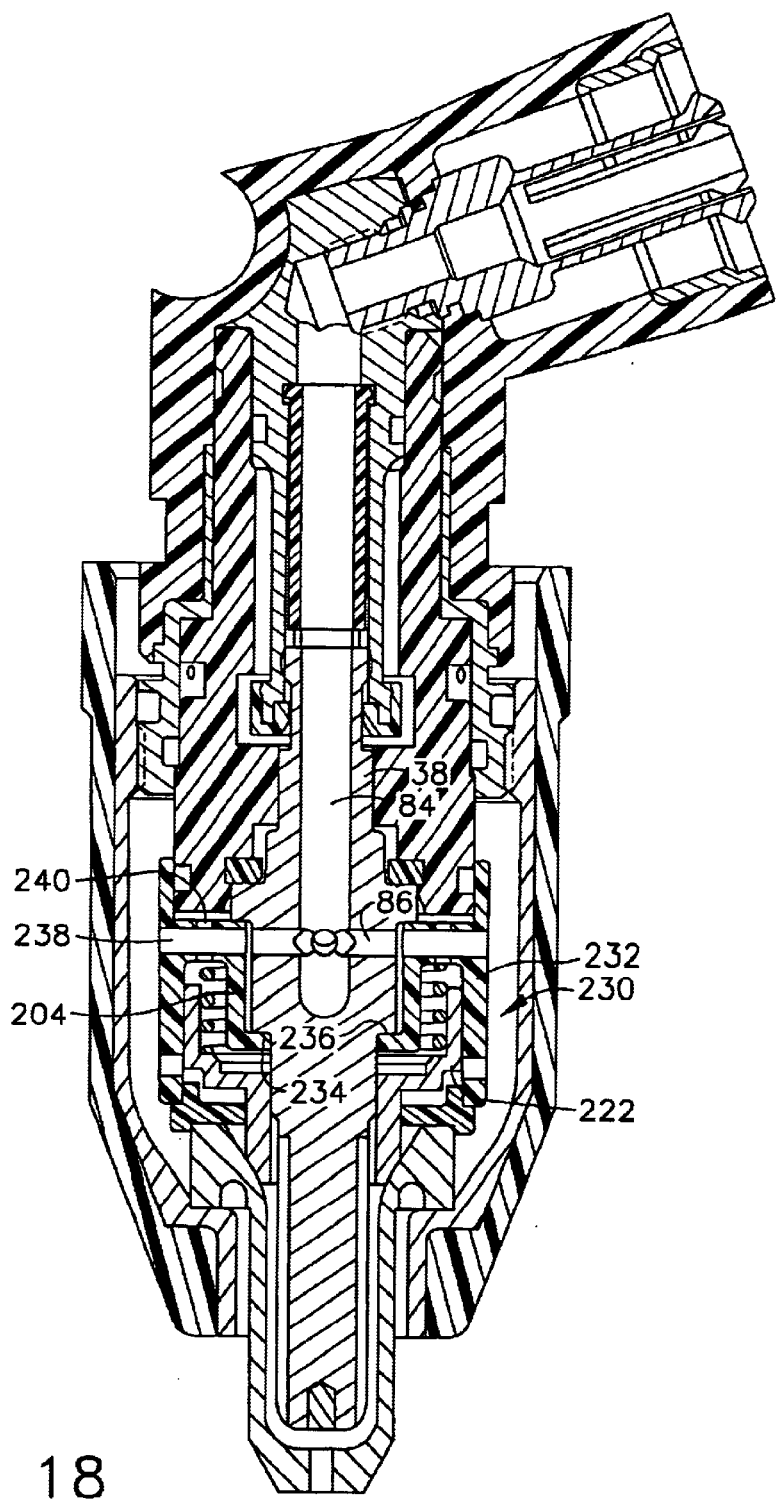
FIG. 18 is a cross-sectional view of a torch head comprising a fourth embodiment of a start cartridge and constructed in accordance with the principles of the present invention.
Figure 19:
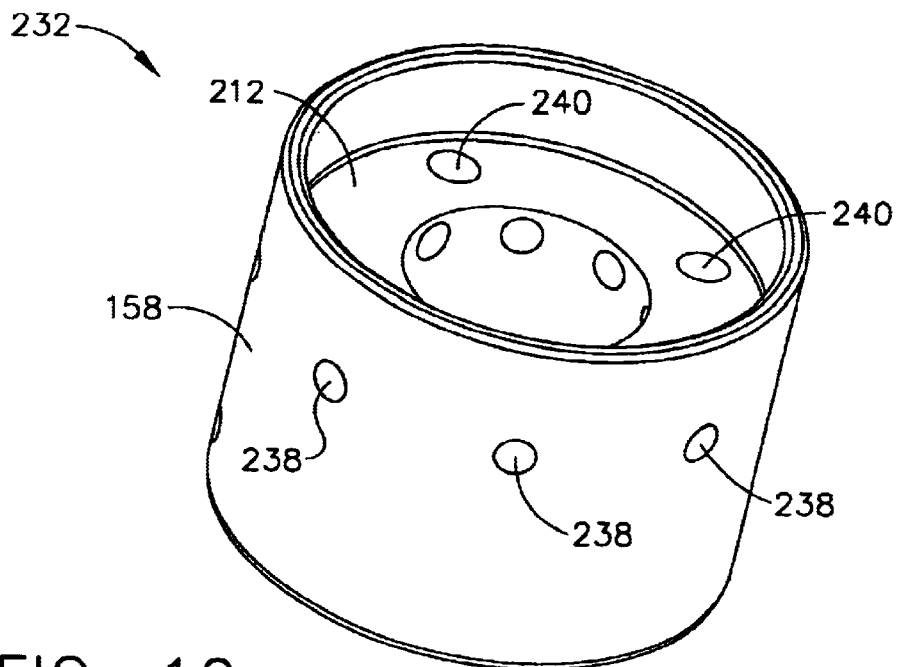
FIG. 19 is an upper perspective view of a cartridge body comprising proximal radial holes and axial vent holes and constructed in accordance with the principles of the present invention.
Figure 20:
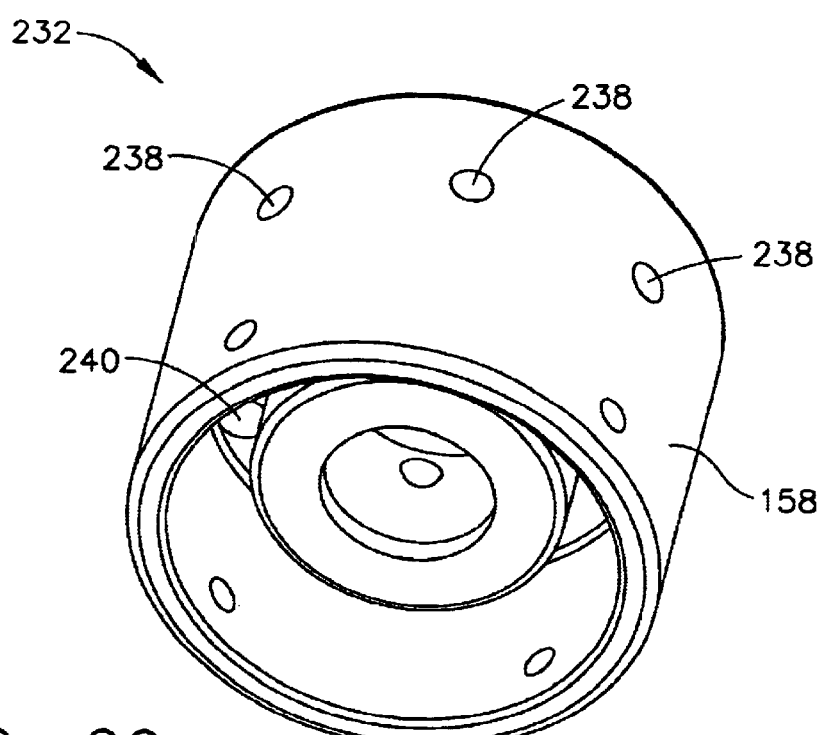
FIG. 20 is a lower perspective view of the cartridge body comprising proximal radial holes and axial vent holes in accordance with the principles of the present invention.
Figure 21:
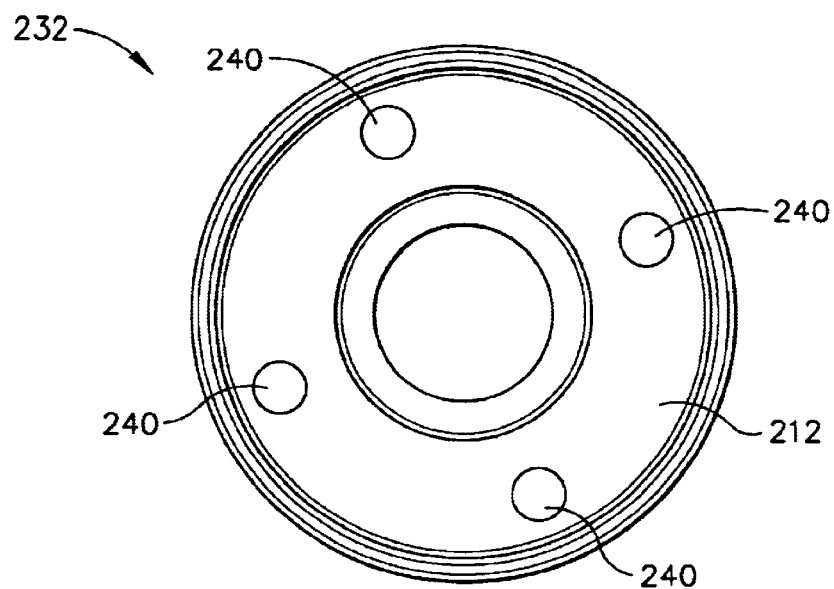
FIG. 21 is a top view of the cartridge body comprising axial vent holes in accordance with the principles of the present invention.
Figure 22:
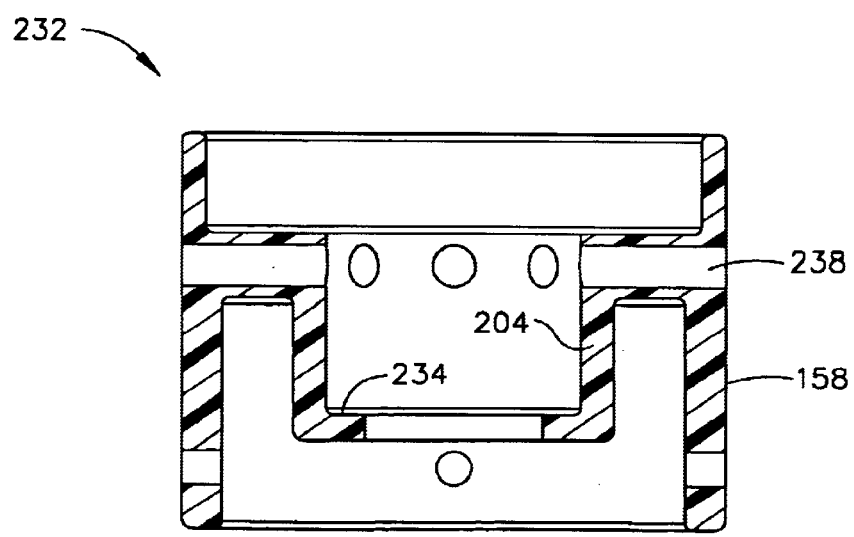
FIG. 22 is a cross-sectional view of the cartridge body comprising proximal radial holes and axial vent holes in accordance with the principles of the present invention.

Referring to FIG. 18, another form of a start cartridge 230 is illustrated, wherein the start cartridge 230 comprises a cartridge body 232 that defines a distal face 234 formed at a distal portion of the internal annular flange 204. As shown, a distal collar 236 formed on the electrode 38 is in electrical contact with the distal face 234 such that the initiator 222 remains in electrical contact with the negative, or cathode, side of the power supply. Additionally, the start cartridge 232 defines a plurality of proximal radial holes 238 that are used to direct the primary working gas that flows through the central bore 84 and gas distributing holes 86 of the electrode 38 into the primary gas chamber 126 to generate and stabilize a plasma stream as previously described.

Referring to FIGS. 19 through 22, the cartridge body 232 is further illustrated with the distal face 234, the proximal radial holes 238, and a plurality of vent holes 240 that are formed through the proximal face 212 and are employed to vent the gas from the start cartridge 230 when the initiator 222 is moved against the resilient bias as previously described. As shown, the proximal radial holes 238 are formed normal through the cylindrical sidewall 158, wherein a total of eight (8) proximal radial holes 238 are employed, although one or more proximal radial holes 238 may be used according to specific operational requirements.

Figure 23B:
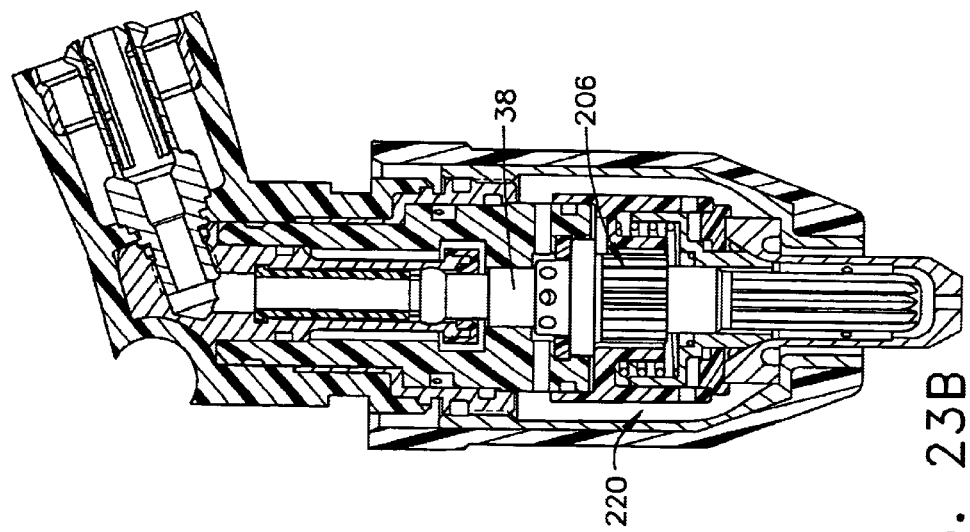
FIG. 23B is a cross-sectional view of a torch head comprising an electrode defining axial grooves along the central portion and constructed in accordance with the principles of the present invention.
Figure 23A:
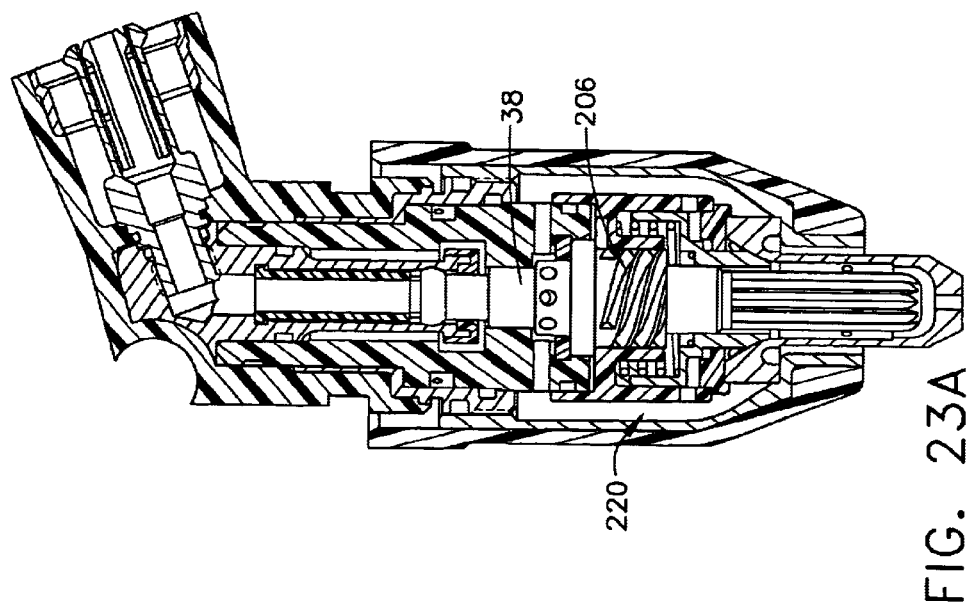
FIG. 23A is a cross-sectional view of a torch head comprising an electrode defining spiral grooves along a central portion and constructed in accordance with the principles of the present invention.

Referring now to FIGS. 23A and 23B, the central portion 206 of the electrode 38 may be configured to provide additional cooling of the electrode 38, wherein the central portion 206 may define spiral grooves 230 or axial grooves 232 as shown. Accordingly, the grooves 230 and 232 direct and control the gas being vented through the start cartridge 220 along the central portion 206 of the electrode 38 to provide additional cooling as necessary.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A plasma arc torch comprising:
   an electrode;
   a tip; and
   an initiator in electrical contact with the electrode and in contact with the tip, the initiator being movable to separate from the tip and establish a pilot arc between the initiator and the tip.

2. The plasma arc torch according to claim 1, wherein the tip defines a generally conical surface and the initiator defines a beveled contact surface, such that the beveled contact surface engages the generally conical surface when the initiator is biased into contact with the tip.

3. The plasma arc torch according to claim 1 further comprising a start cartridge disposed between the electrode and the tip, the start cartridge comprising:
   a cartridge assembly;
   a biasing member disposed within the cartridge assembly; and
   the initiator being disposed within the cartridge assembly, wherein the biasing member biases the initiator into contact with the tip.

4. The plasma arc torch according to claim 3, wherein the cartridge assembly further comprises a cartridge body defining a plurality of radial gas holes that direct a portion of a working gas into the start cartridge to overcome the bias of the spring to separate the initiator from the tip.

5. The plasma arc torch according to claim 4, wherein the cartridge body further comprises a plurality of axial vent holes to vent a working gas from the start cartridge.

6. The plasma arc torch according to claim 5, wherein the cartridge body further comprises a plurality of proximal radial holes to direct the working gas.

7. The plasma arc torch according to claim 4, wherein the cartridge body further comprises an internal annular flange and at least one gas passage formed in the cartridge body that vents a portion of the along a central portion of the electrode and through the start cartridge.

8. The plasma arc torch according to claim 3, wherein the cartridge assembly further comprises a cartridge body defining a plurality of gas passages that direct a portion of a working gas into the start cartridge to overcome the bias of the spring to separate the initiator from the tip.

9. The plasma arc torch according to claim 8, wherein the cartridge body further comprises a plurality of axial vent holes to vent a working gas from the start cartridge.

10. The plasma arc torch according to claim 9, wherein the cartridge body further comprises a plurality of proximal radial holes to direct the working gas.

11. The plasma arc torch according to claim 8, wherein the cartridge body further comprises an internal annular flange and at least one gas passage formed in the cartridge body that vents a portion of the working gas along a central portion of the electrode and through the start cartridge.

12. The plasma arc torch according to claim 3, wherein the cartridge assembly further comprises a cartridge body and a tip seat secured to a distal portion of the cartridge body.

13. The plasma arc torch according to claim 12, wherein the cartridge body is conductive and the tip seat is insulative.

14. The plasma arc torch according to claim 12, wherein the cartridge assembly further comprises a conductive member disposed at a proximal end of the cartridge body, and the cartridge body and the tip seat are insulative.

15. The plasma arc torch according to claim 1, wherein the initiator further comprises a plurality of vent holes that direct a portion of the working gas along a central portion of the electrode.

16. The plasma arc torch according to claim 1, wherein the biasing member is a coil spring.

17. The plasma arc torch according to claim 1, wherein the tip defines swirl holes to direct a primary working gas into a primary gas passage formed between the electrode and the tip to form a plasma stream, and secondary gas holes to direct a secondary gas distally along the tip to stabilize the plasma stream.

18. A plasma arc torch comprising:
   an electrode;
   a tip; and
   a start cartridge disposed between the electrode and the tip, the start cartridge further comprising:
      a cartridge assembly;
      a biasing member disposed within the cartridge assembly; and
      an initiator disposed within the cartridge assembly, the initiator being resiliently biased into contact with the tip by the biasing member, the initiator being movable against the resilient bias to separate from the tip and establish a pilot arc between the initiator and the tip.

19. The plasma arc torch according to claim 18, wherein the cartridge assembly further comprises a cartridge body defining a plurality of radial gas holes that direct a portion of a working gas into the start cartridge to overcome the bias of the spring to separate the initiator from the tip.

20. The plasma arc torch according to claim 19, wherein the cartridge body further comprises a plurality of axial vent holes to vent a working gas from the start cartridge.

21. The plasma arc torch according to claim 20, wherein the cartridge body further comprises a plurality of proximal radial holes to direct the working gas.

22. The plasma arc torch according to claim 19, wherein the cartridge body further comprises an internal annular flange and at least one gas passage formed in the cartridge body that vents a portion of the working gas along a central portion of the electrode and through the start cartridge.

23. The plasma arc torch according to claim 18, wherein the cartridge assembly further comprises a cartridge body defining a plurality of gas passages that direct a portion of a working gas into the start cartridge to overcome the bias of the spring to separate the initiator from the tip.

24. The plasma arc torch according to claim 23, wherein the cartridge body further comprises a plurality of axial vent holes to vent a working gas from the start cartridge.

25. The plasma arc torch according to claim 24, wherein the cartridge body further comprises a plurality of proximal radial holes to direct the working gas.

26. The plasma arc torch according to claim 23, wherein the cartridge body further comprises an internal annular flange and at least one gas passage formed in the cartridge body that vents a portion of the working gas along a central portion of the electrode and through the start cartridge.

27. The plasma arc torch according to claim 18, wherein the initiator further comprises a plurality of vent holes that direct a portion of the working gas along a central portion of the electrode.

28. The plasma arc torch according to claim 18, wherein the biasing member is a coil spring.

29. The plasma arc torch according to claim 18, wherein the tip defines swirl holes to direct a primary working gas into a primary gas passage formed between the electrode and the tip to form a plasma stream, and secondary gas holes to direct a secondary gas distally along the tip to stabilize the plasma stream.

30. The plasma arc torch according to claim 18, wherein the tip defines a generally conical surface and the initiator defines a beveled contact surface, such that the beveled contact surface engages the generally conical surface when the initiator is biased into contact with the tip.

31. The plasma arc torch according to claim 18, wherein the cartridge assembly further comprises a cartridge body and a tip seat secured to a distal portion of the cartridge body.

32. The plasma arc torch according to claim 31, wherein the cartridge body is conductive and the tip seat is insulative.

33. The plasma arc torch according to claim 31, wherein the cartridge assembly further comprises a conductive member disposed at a proximal end of the cartridge body, and the cartridge body and the tip seat are insulative.

34. A start cartridge for use in initiating a pilot arc in a plasma arc torch comprising:
   a cartridge assembly;
   a biasing member disposed within the cartridge assembly; and
   an initiator disposed within the cartridge assembly, the initiator being resiliently biased such that the initiator is movable against the resilient bias to establish a pilot arc between the initiator and a tip within the plasma arc torch.

35. The start cartridge according to claim 34, wherein the cartridge assembly further comprises a cartridge body and a tip seat secured to a distal portion of the cartridge body.

36. The start cartridge according to claim 35, wherein the cartridge body further comprises a plurality of radial gas holes that direct a portion of a working gas into the start cartridge to overcome the bias of the biasing member to move the initiator.

37. The start cartridge according to claim 35, wherein the cartridge body further comprises a plurality of gas passages that direct a portion of a working gas into the start cartridge to overcome the bias of the spring to separate the initiator from the tip.

38. The start cartridge according to claim 35, wherein the cartridge body further comprises a plurality of axial vent holes to vent a working gas from the start cartridge.

39. The start cartridge according to claim 38, wherein the cartridge body further comprises a plurality of proximal radial holes to direct the working gas.

40. The start cartridge according to claim 35, wherein the cartridge body further comprises an internal annular flange and at least one gas passage formed in the cartridge body that vents a portion of the working gas along a central portion of the electrode and through the start cartridge.

41. The start cartridge according to claim 35, wherein the cartridge body is conductive and the tip seat is insulative.

42. The start cartridge according to claim 35, wherein the cartridge assembly further comprises a conductive member disposed at a proximal end of the cartridge body, and the cartridge body and the tip seat are insulative.

43. The start cartridge according to claim 34, wherein initiator further comprises a plurality of vent holes that direct a portion of the working gas along a central portion of the electrode.

44. The start cartridge according to claim 34, wherein the biasing member is a coil spring.

45. The start cartridge according to claim 34, wherein the initiator defines a beveled contact surface.

46. A start cartridge for use in initiating a pilot arc in a plasma arc torch comprising:
   a cartridge body;
   a tip seat secured to a distal portion of the cartridge body;
   a biasing member disposed within the cartridge body; and
   an initiator disposed within the cartridge body, the initiator being resiliently biased such that the initiator is movable against the resilient bias to establish a pilot arc between the initiator and a tip within the plasma arc torch.

47. The start cartridge according to claim 46, wherein the cartridge body further comprises a plurality of radial gas holes that direct a portion of a working gas into the start cartridge to overcome the bias of the biasing member to move the initiator.

48. The start cartridge according to claim 46, wherein the cartridge body further comprises a plurality of gas passages that direct a portion of a working gas into the start cartridge to overcome the bias of the spring to separate the initiator from the tip.

49. The start cartridge according to claim 46, wherein the cartridge body further comprises a plurality of axial vent holes to vent a working gas from the start cartridge.

50. The start cartridge according to claim 49, wherein the cartridge body further comprises a plurality of proximal radial holes to direct the working gas.

51. The start cartridge according to claim 46, wherein the cartridge body further comprises an internal annular flange and at least one gas passage formed in the cartridge body that vents a portion of the working gas along a central portion of the electrode and through the start cartridge.

52. The start cartridge according to claim 46, wherein the cartridge body is conductive and the tip seat is insulative.

53. The start cartridge according to claim 46, wherein the cartridge assembly further comprises a conductive member disposed at a proximal end of the cartridge body, and the cartridge body and the tip seat are insulative.

54. The start cartridge according to claim 46, wherein initiator further comprises a plurality of vent holes that direct a portion of the working gas along a central portion of the electrode.

55. The start cartridge according to claim 46, wherein the biasing member is a coil spring.

56. The start cartridge according to claim 46, wherein the initiator defines a beveled contact surface.

57. A start cartridge for use in initiating a pilot arc in a plasma arc torch comprising:
a cartridge assembly; and
an initiator disposed within the cartridge assembly, the initiator being resiliently biased such that the initiator is movable against the resilient bias to establish a pilot arc between the initiator and a tip within the plasma arc torch.

58. The start cartridge according to claim 57, wherein the cartridge assembly further comprises a cartridge body and a tip seat secured to a distal portion of the cartridge body.

59. The start cartridge according to claim 58, wherein the cartridge body further comprises a plurality of radial gas holes that direct a portion of a working gas into the start cartridge to overcome the bias of the biasing member to move the initiator.

60. The start cartridge according to claim 58, wherein the cartridge body further comprises a plurality of gas passages that direct a portion of a working gas into the start cartridge to overcome the bias of the spring to separate the initiator from the tip.

61. The start cartridge according to claim 58, wherein the cartridge body further comprises a plurality of axial vent holes to vent a working gas from the start cartridge.

62. The start cartridge according to claim 61, wherein the cartridge body further comprises a plurality of proximal radial holes to direct the working gas.

63. The start cartridge according to claim 58, wherein the cartridge body further comprises an internal annular flange and at least one gas passage formed in the cartridge body that vents a portion of the working gas along a central portion of the electrode and through the start cartridge.

64. The start cartridge according to claim 58, wherein the cartridge body is conductive and the tip seat is insulative.

65. The start cartridge according to claim 58, wherein the cartridge assembly further comprises a conductive member disposed at a proximal end of the cartridge body, and the cartridge body and the tip seat are insulative.

66. The start cartridge according to claim 57, wherein initiator further comprises a plurality of vent holes that direct a portion of the working gas along a central portion of the electrode.

67. The start cartridge according to claim 57 further comprising a biasing member disposed within the cartridge assembly, the biasing member resiliently biasing the initiator.

68. The start cartridge according to claim 67, wherein the biasing member is a coil spring.

69. The start cartridge according to claim 57, wherein the initiator defines a beveled contact surface.

70. An initiator for initiating a pilot arc in a plasma arc torch, the initiator being movable against a resilient bias to establish a pilot arc between the initiator and a tip within the plasma arc torch.

71. The initiator according to claim 70, wherein the initiator defines a beveled contact surface.

72. The initiator according to claim 70 further comprising a plurality of vent holes to vent a working gas from the initiator.

73. The initiator according to claim 72 further comprising a proximal face, recessed proximal face, and an annular wall formed between the proximal face and the recessed proximal face, wherein the vent holes are formed through the annular wall.

74. The initiator according to claim 70 further comprising a plurality of axial vent holes to vent a working gas from the initiator.

75. An initiator for initiating a pilot arc in a plasma arc torch, the initiator being movable against a resilient bias to establish a pilot arc between the initiator and a tip within the plasma arc torch, the initiator comprising:
a proximal face;
a recessed proximal face;
an annular wall formed between the proximal face and the recessed proximal face; and
a plurality of vent holes are formed through the annular wall,
wherein the vent holes vent a working gas from the initiator.

76. A plasma arc torch head for use with a fixed electrode, a fixed tip, and a source of gas and electric power for initiating a pilot arc comprising:
head vent holes disposed at a proximal section of the torch head, wherein the vent holes vent at least a portion of the gas from the torch head.

77. The plasma arc torch head according to claim 76 further comprising:
an insulating body defining a plurality of axial vent holes and radial vent holes; and
an anode disposed around the insulating body, the anode defining a plurality of radial vent holes,
wherein the vent holes are in fluid communication to vent the gas from the torch head.

78. A plasma arc torch comprising:
a torch head comprising:
a housing;
a cathode disposed within the housing and connected to a supply of gas and electric power;
an anode disposed within the housing and connected to the supply of gas and electric power;
an insulating body disposed between the cathode and the anode;
an electrode removably engaged with the cathode;
a tip in a spaced relationship with the electrode;
a shield cup removably engaged with the anode; and
an initiator resiliently biased into contact with the tip, the initiator being movable against the resilient bias to separate from the tip and establish a pilot arc between the initiator and the tip.

79. The plasma arc torch according to claim 78 further comprising a start cartridge disposed between the electrode and the tip, the start cartridge comprising:
a cartridge assembly;
a biasing member disposed within the cartridge assembly; and
the initiator disposed within the cartridge assembly,
wherein the biasing member biases the initiator into contact with the tip.

80. The plasma arc torch according to claim 79, wherein the cartridge assembly further comprises a cartridge body and a tip seat secured to a distal portion of the cartridge body.

81. The plasma arc torch according to claim 80, wherein the cartridge body further comprises a plurality of radial gas holes that direct a portion of a working gas into the start cartridge to overcome the bias of the biasing member to move the initiator.

82. The plasma arc torch according to claim 80, wherein the cartridge body further comprises a plurality of gas passages that direct a portion of a working gas into the start cartridge to overcome the bias of the spring to separate the initiator from the tip.

83. The plasma arc torch according to claim 80, wherein the cartridge body further comprises a plurality of axial vent holes to vent a working gas from the start cartridge.

84. The plasma arc torch according to claim 83, wherein the cartridge body further comprises a plurality of proximal radial holes to direct the working gas.

85. The plasma arc torch according to claim 80, wherein the cartridge body further comprises an internal annular flange and at least one gas passage formed in the cartridge body that vents a portion of the working gas along a central portion of the electrode and through the start cartridge.

86. The plasma arc torch according to claim 80, wherein the cartridge body is conductive and the tip seat is insulative.

87. The plasma arc torch according to claim 80, wherein the cartridge assembly further comprises a conductive member disposed at a proximal end of the cartridge body, and the cartridge body and the tip seat are insulative.

88. The plasma arc torch according to claim 78, wherein the initiator further comprises a plurality of vent holes that direct a portion of the working gas along a central portion of the electrode.

89. The plasma arc torch according to claim 78, wherein the insulating body further comprises a plurality of axial vent holes and radial vent holes in fluid communication with the cartridge body axial vent holes, and the anode further comprises a plurality of radial vent holes in communication with the insulating body radial vent holes to vent the working gas from the start cartridge.

90. The plasma arc torch according to claim 78 further comprising a conductive insert disposed within the shield cup and in electrical contact with the tip and the anode.

91. The plasma arc torch according to claim 78, wherein the electrode defines a central portion that comprises spiral grooves.

92. The plasma arc torch according to claim 78, wherein the electrode defines a central portion that comprises axial grooves.

93. A plasma arc torch comprising:
an electrode;
a tip; and
a start cartridge disposed between the electrode and the tip, the start cartridge further comprising:
a cartridge body;
a tip seat secured to a distal portion of the cartridge body;
a biasing member disposed within the cartridge body; and
an initiator disposed within the cartridge body, the initiator being resiliently biased into contact with the tip by the biasing member, the initiator being movable against the resilient bias to separate from the tip and establish a pilot arc between the initiator and the tip.

94. A method of initiating a pilot arc in a plasma arc torch, the method comprising the steps of:
biasing an initiator into contact with a tip;
providing a source of gas and electric power; and
directing at least a portion of the gas to overcome the bias to separate the initiator from the tip,
wherein the pilot arc is drawn between the initiator and the tip as the bias is overcame.

95. The method according to claim 94 further comprising the step of venting the portion of gas used to overcome the bias through head vent holes in a torch head.

96. The method according to claim 94 further comprising the step of directing another portion of the gas through the tip for swirling the gas to form a plasma stream and for providing a secondary gas flow to stabilize the plasma stream.

97. A method of venting gas from a plasma arc torch comprising a fixed electrode and a fixed tip, the method comprising the steps of:
providing a source of gas and electric power;
directing the gas and electric power to initiate a pilot arc; and
venting at least a portion of the gas through head vent holes.

98. The method according to claim 97 further comprising the steps of:
venting the gas through a start cartridge;
venting the gas through an insulating body;
venting the gas through an anode; and
venting the gas through an opening in a shield cup.

99. A method of initiating a pilot arc in a plasma arc torch, the method comprising the steps of:
providing a source of gas to move an initiator into contact with a tip;
providing a source of electric power; and
moving the initiator away from contact with the tip to draw an arc between the initiator and the tip.

* * * * *